(12) United States Patent
Heiberger

(10) Patent No.: US 8,831,974 B1
(45) Date of Patent: Sep. 9, 2014

(54) CAMPAIGN SPECIFICATION SYSTEM AND METHOD

(75) Inventor: Michael Heiberger, Landenberg, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 277 days.

(21) Appl. No.: 12/466,071

(22) Filed: May 14, 2009

Related U.S. Application Data

(63) Continuation-in-part of application No. 12/429,319, filed on Apr. 24, 2009, now abandoned.

(51) Int. Cl.
*G06Q 30/00* (2012.01)
*G06Q 90/00* (2006.01)

(52) U.S. Cl.
CPC ..................................... *G06Q 90/00* (2013.01)
USPC .......................................................... 705/14.1

(58) Field of Classification Search
CPC ...................................................... G06Q 90/00
USPC ....................................................... 705/14.1
See application file for complete search history.

(56) References Cited

U.S. PATENT DOCUMENTS

| | | | |
|---|---|---|---|
| 4,674,041 A | 6/1987 | Lemon et al. | |
| 4,703,423 A | 10/1987 | Bado et al. | |
| 5,283,731 A | 2/1994 | Lalonde et al. | |
| 5,347,632 A | 9/1994 | Filepp et al. | |
| 5,664,948 A | 9/1997 | Dimitriadis et al. | |
| 6,334,110 B1 | 12/2001 | Walter et al. | |
| 6,601,041 B1 | 7/2003 | Brown et al. | |
| 7,003,476 B1 | 2/2006 | Samra et al. | |
| 7,729,942 B2 | 6/2010 | Jensen et al. | |
| 8,515,810 B2 | 8/2013 | Grimes | |
| 2004/0024608 A1 | 2/2004 | Saenz et al. | |
| 2005/0108107 A1 | 5/2005 | Grayson et al. | |
| 2005/0171808 A1 | 8/2005 | Saenz et al. | |
| 2005/0182647 A1 | 8/2005 | Saenz et al. | |
| 2005/0216525 A1 | 9/2005 | Wachholz-Prill et al. | |
| 2006/0047571 A1 | 3/2006 | Garcia et al. | |
| 2009/0177542 A1 * | 7/2009 | Haberman et al. ............... | 705/14 |

FOREIGN PATENT DOCUMENTS

| | | |
|---|---|---|
| EP | 2196957 | 6/2010 |
| WO | WO0137152 | 5/2001 |
| WO | WO0146896 | 6/2001 |
| WO | WO0150323 | 7/2001 |

* cited by examiner

*Primary Examiner* — Daniel Lastra
(74) *Attorney, Agent, or Firm* — Goodwin Procter, LLP

(57) ABSTRACT

The invention is directed to a method and system for automatic management of targeted marketing campaigns. The system may include user interface presentation components for allowing selection of marketing matrix data defining a target population and selection of suppressions for limiting the target population. The system may further include integration components implemented by a processor for integrating the marketing matrix with the suppressions and automatically generating record selection components for automatically selecting records from a database based on the marketing matrix data and suppressions and creating a selection table including the selected records. Additionally, the system may include a list generation engine for generating a campaign list based on the created selection table and transmission components for transmitting the generated campaign list to at least one list recipient.

30 Claims, 21 Drawing Sheets

FIG 9

| | 1010 | 1030 | 1020 | | |
|---|---|---|---|---|---|
| | Upload | Cancel | View Upload Log | | |

| Type | Group | Message | User | Date |
|---|---|---|---|---|
| ? INFO | be18dd59-f8074ff0-b64a | Push of marketing matrix failed. | tmarsh | 4/25/2008 4:42:53 PM |
| X ERROR | be18dd59-f8074ff0-b64a | Error on record 1: CELL_PRIORITY is invalid. | tmarsh | 4/25/2008 4:42:53 PM |
| ? INFO | be18dd59-f8074ff0-b64a | Beginning push of marketing matrix. | tmarsh | 4/25/2008 4:42:53 PM |
| ? INFO | be18dd59-f8074ff0-b64a | Upload complete. | tmarsh | 4/25/2008 4:42:53 PM |
| ? INFO | be18dd59-f8074ff0-b64a | 14 records uploaded. | tmarsh | 4/25/2008 4:42:53 PM |
| ? INFO | be18dd59-f8074ff0-b64a | 14 records in import. | tmarsh | 4/25/2008 4:42:53 PM |
| ? INFO | be18dd59-f8074ff0-b64a | Starting upload of file [marketing_matrix.csv] | tmarsh | 4/25/2008 4:42:53 PM |
| ? INFO | be18dd59-f8074ff0-b64a | Begin processing of marketing matrix | tmarsh | 4/25/2008 4:42:53 PM |

Enterprise Gateway (Test) – Microsoft Internet Explorer provided by Acxiom Corporation File  Edit  View  Favorites  Tools  Help Back  Search  Favorites Address http://snickers/frames.asp?RDCT=

Links

Home  Knowledge  Applications  Settings  Inbound/Outbound  Tools  Logout

CampaignTrak  CST(2008.4)  File Repository

Campaign Level: MEDIUM  1710

1700

| | Date | Scheduled | Actual | Adjusted |
|---|---|---|---|---|
| | | | 1740 | 1750 |
| Drop Date | 1720 | 04/14/2008 | | |
| Specification Handoff | | | | |
| Lettershop IBTM Vendors Assigned | | | | |
| Initial Production Date | | | | |
| Final Nthing Specs Due | | 3/17/2008 | | 4/26/2008 |
| Tele. Phone Append Request | | | | 4/26/2008 |
| Decision Mgmt PA Extract Sign-off Due Date | | | | 4/26/2008 |
| Extract Due at Acxiom | | 3/24/2008 | | 4/26/2008 |
| File Due at Vendor | | 3/28/2008 | | 4/26/2008 |
| ACAPS File Ship Date | | 4/7/2008 | | 4/26/2008 |
| ACAPS File Load Date | | 3/27/2008 | | 4/26/2008 |
| IBTM files due to Vendor | | | | 4/26/2008 |
| Partner Opt-Out / Non-Contract Due Date | | | | |
| URL Audit Due Date | | | | |
| Contract Target Delivery Date | | | | |
| CPLAN Update Date | | | | |
| Promo Ing Ship Date (☐ Include in Monthly Batch) | | | | |

Calculate Dates

CAMPAIGN SPECIFICATION SYSTEM AND METHOD

CROSS REFERENCE TO RELATED APPLICATIONS

This patent application is a continuation-in-part of U.S. patent application Ser. No. 12/429,319, filed Apr. 24, 2009. The earlier application is hereby incorporated by reference herein in its entirety.

TECHNICAL FIELD

Embodiments of the invention are related systems and methods for facilitating targeted marketing campaigns.

BACKGROUND OF THE INVENTION

In recent years, management of marketing campaigns has become increasingly complex due to vast data collection, storage, and analysis capabilities pertaining to customers and potential customers. Further complicating marketing campaign management is the existence of growing number of channels available for collection of data and for transmission of targeted marketing materials based upon the collected data.

Targeted marketing messages can be designed to compel individual consumers to purchase specific products or services. Increasingly, organizations are using multiple marketing channels, including outbound channels such as direct mail, telemarketing, e-mail, and direct response television, to deliver these messages to their customers. In some circumstances, organizations are also exploiting inbound channels, such the Web, customer call centers, and point of sale facilities. Such multi-channel integration provides the potential for retailers to deliver consistent messaging across all of their customer channels, both inbound and outbound.

The increase in the number of marketing campaigns, the improving ability the market has to capture and retain detailed information on customer transactions, and the tact that all of this data is being managed and used by more and more people, create a greater need for integrated tools and systems to manage the data generated and repeatedly used by these organizations.

One of the initial steps in organizing a targeted marketing campaign has been the collection of data. As set forth above, data capture has become much more complex and diverse. Data may be captured from POS terminals, online purchases, retailers, etc. After the data is collected, it may be stored in a database accessible to marketers.

Upon the initiation of a marketing campaign, marketers must formulate requirements for campaign targets. The requirements may relate to purchasing behaviors, demographic characteristics, credit rating, or other factors.

Based on particular marketing requirements and the collected data, recipients are selected from available databases to create a list of recipients, also known as the campaign list. The list is, at least in part, based on data collected pertaining to customer demographic and behavioral characteristics.

However, after the initial creation stage, the list is modified based on regulations pertaining to the distribution of marketing materials or other limiting factors known as suppressions. The suppressions may restrict available recipients based on a number of factors including time of transmission, location of recipient, or other factors.

After creation, the lists are implemented by marketers for distribution of marketing materials. As set forth above, the marketing materials may be distributed through one or more diverse communication channels.

Data collection, retrieval, and creation of campaign lists have historically been accomplished manually. However, manual list construction and fulfillment often requires several days to one or more weeks. Thus, a system is needed that can automatically perform these functions, but can be adjusted to allow manual intervention when required.

In recent years, due to the growing complexity and volume of data as well as the size of the marketing campaigns initiated, efforts have been made to automate much of the marketing campaign process. However, the currently available methods and systems have been insufficient for satisfying marketing campaign demands. In particular, current solutions have been unable to handle data volume with adequate speed and additionally have been cumbersome and difficult to use. Automated systems frequently fail to allow sufficient manual intervention to enable correction.

Furthermore, although existing systems may include automated steps, they generally require computer professionals to create code for records selection based on specific campaign parameters. The time, effort, and resources required for this process significantly reduce campaign efficiency and increase campaign cost.

Thus, a solution is needed for campaign management that automatically incorporates requirements, selects records based on the requirements and generates a list with all necessary information to facilitate distribution of marketing materials. A solution is further needed that makes user intervention in the automated process simple and accessible.

SUMMARY OF THE INVENTION

In one aspect of the invention, a computer-implemented method is provided for management of targeted marketing campaigns. The system comprises user interface presentation components for allowing selection of marketing matrix data defining a target population and selection of suppressions for limiting the target population. The system additionally comprises integration components implemented by a processor for integrating the marketing matrix with the suppressions and automatically generating record selection components for automatically selecting records from a database based on the marketing matrix data and suppressions and creating a selection table including the selected records. The system further comprises a list generation engine for generating a campaign list based on the created selection table and transmission components for transmitting the generated campaign list to at least one list recipient.

In an additional aspect of the invention, a computer-implemented method is provided for management of targeted marketing campaigns. The method implements a computing system including user input components, a processor, and a database. The method may include providing user interface presentation components for allowing selection of marketing matrix data defining a target population and selection of suppressions for limiting the target population. The method may additionally include receiving entered marketing matrix and suppression data entered through the user input components and integrating, using the processor, the marketing matrix with the suppressions and automatically generating record selection components based on the marketing matrix data and suppressions. The method may further include selecting records from the database using the automatically generated record selection components, creating a selection table including the selected records and generating a campaign list based on the created selection table.

In a further aspect of the invention, a computer-implemented system is provided for automatic management of targeted marketing campaigns. The system includes a processor, a database, and user input tools, and comprises a standards requirements engine for standardizing requirements for a marketing campaign. The standards requirements engine may include marketing matrix components for storing selectable marketing matrix data and allowing entry of additional marketing matrix data, and suppression components for storing suppressions, the stored suppressions including selectable suppressions and mandatory suppressions, and for allowing entry of additional suppressions. The standards requirements engine may additionally include user interface presentation components for allowing entry of marketing matrix data defining a target population and selection of suppressions for limiting the target population, the selections accomplished through the user input tools. The system may additionally include integration components implemented by the processor for integrating the marketing matrix with the suppressions and generating record selection components for automatically selecting records from the database based on the marketing matrix data and suppressions and creating a selection table including the selected records.

In this aspect, the system may further include records processing components for processing records stored in the database to provide a campaign list. The records processing components include record selection components for automatically selecting records from the database based on the marketing matrix data and suppression components and creating a selection table including the selected records. The system also includes verification components for running reports validating the selection process, and a list generation engine for generating the campaign list based on the created selection table. The system may additionally include fulfillment components for facilitating fulfillment of the marketing campaign, the fulfillment components comprising transmission components for transmitting the generated campaign list to at least one list recipient and tracking components implementing a stored contact history table to track recipients and responses.

BRIEF DESCRIPTION OF THE DRAWINGS

The present invention is described in detail below with reference to the attached drawings figures, wherein:

FIG. 9 illustrates a user interface in accordance with an embodiment of the invention;

FIG. 10 is a user interfaces illustrating upload errors in accordance with an embodiment of the invention;

FIG. 12 illustrates an extract detail user interface in accordance with an embodiment of the invention;

FIG. 13 illustrates a cell list user interface in accordance with an embodiment of the invention;

FIG. 14 illustrates a cell detail user interface in accordance with an embodiment of the invention;

FIG. 15 illustrates a user interface for displaying suppressions in accordance with an embodiment of the invention;

FIG. 16 illustrates a timeline user interface in accordance with an embodiment of the invention;

FIG. 17 illustrates a populated timeline user interface in accordance with an embodiment of the invention;

FIG. 18 illustrates a special instructions user interface in accordance with an embodiment of the invention;

FIG. 19 illustrates a suppressions user interface in accordance with an embodiment of the invention.

DETAILED DESCRIPTION OF PREFERRED EMBODIMENTS

Embodiments of the present invention are directed to a method and system for managing marketing campaigns. A campaign specification system may include an online repository for all campaign management specification documents. The system may allow standard core campaign extracts to be created automatically. Thus, the system allows for running scripts and performing audits with predefined pass/fail criteria without programmer intervention. The campaign specification system standardizes the creation of campaign specifications and allows specification data to pass through the system and into processes, as well as feed databases that drive automated or manual versions of the several aspects of marketing campaigns. The system may, for example, address population selection, suppressions, auditing, population of production tables, and elimination of several previously required manual data-entry steps. In particular, a system is provided that efficiently creates a mailing list and expedites mailing based on parameters submitted through a marketing matrix.

Figure 1A:
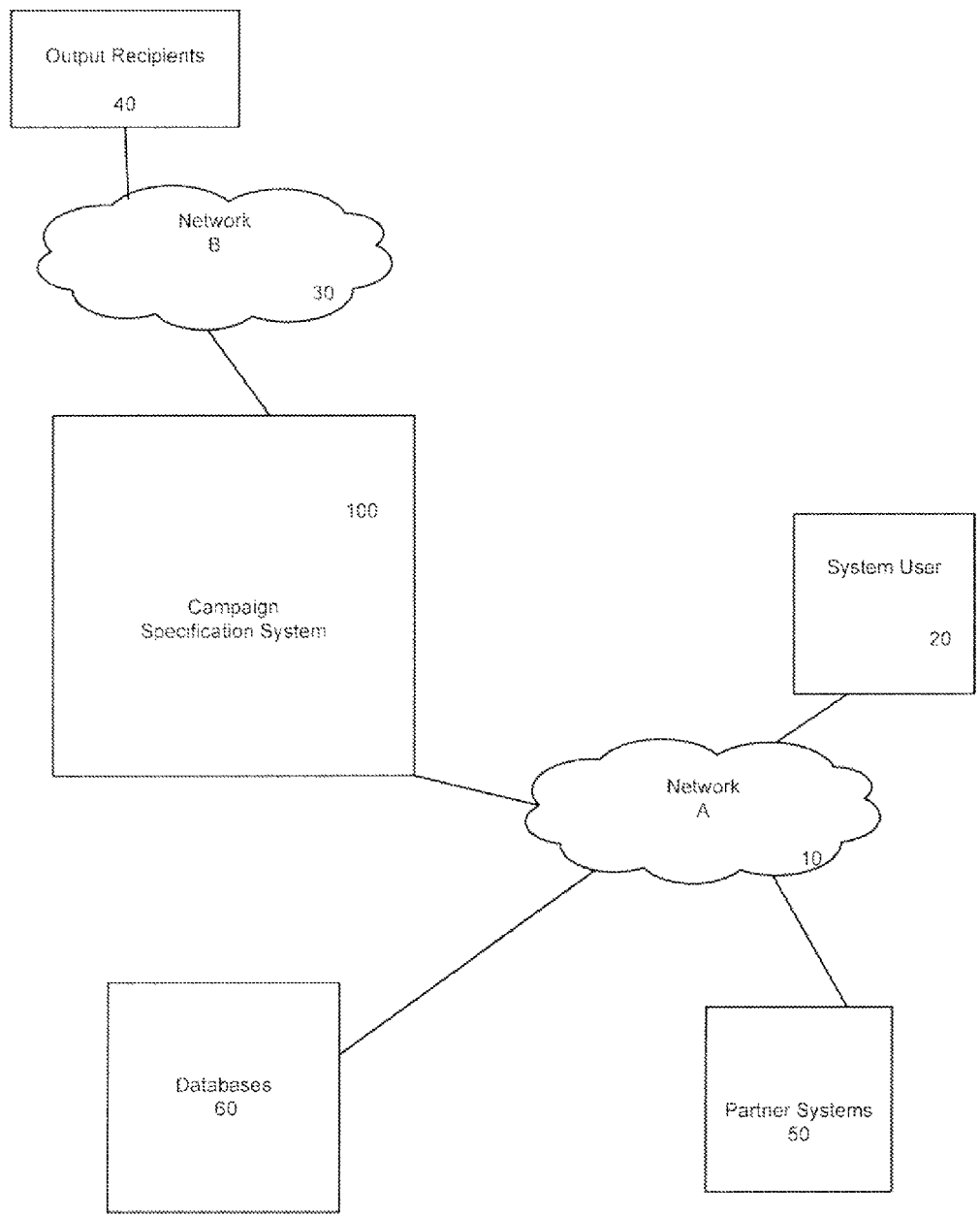
FIG. 1A is a block diagram illustrating an operating environment for a campaign specification system in accordance with an embodiment of the invention.

FIG. 1A is a block diagram illustrating an operating environment for a campaign specification system in accordance with an embodiment of the invention. A campaign specification system 100 may be connected over a network 10 to a system user 20, databases 60, and partner systems 50. The campaign specification system 100 may be connected over an additional network 30 with output recipients 40.

The campaign specification system 100 interacts with the above-described components to facilitate management of marketing campaigns. The campaign specification system 100 may include one or more computing systems programmed with software modules to execute the functions of the system as will be further described below.

The network 10 may for example include the Internet, LAN, WAN, or other type of network. Optionally, the components may all be connected to the campaign specification system 100 through a single network or alternatively over two or more networks.

The system user 20 may include a computing system that enables the user to connect with the campaign specification system 100. The system user 20 accesses user interfaces, to be described below, that allow for efficient control and operation of the campaign specification system 100. Authorized users may include campaign managers and other campaign personnel. Other campaign personnel may have limited accessibility to the campaign specification system 100 based on their specific campaign roles.

The distribution channel 30 may also be or include a network. Alternatively, the distribution channel may include a delivery service or other mechanism for providing output to the output recipients 40. The output recipients 40 may include, for example, printers, vendors, or partners Output may include a file that goes to the print vendor so that the print vendor is able to print names and addresses on fulfillment pieces. The system may send out another file that goes to inbound telemarketing companies as any mail piece transmitted in the outbound direction that provides the option of an inbound call. Ultimate output recipients receive marketing materials from the initial output recipients. The ultimate output recipients may included those named on the lists as well as seed names, which are names of marketing supply stores includes in the prepared mailing list to ensure that mailings were properly assembled.

Output recipients 40 may also include a credit processing or ACAPs system, which can match output information against the records that come back for fulfillment. Output recipients 40 may also include credit bureaus that are required to be notified regarding offers of credit.

The partner systems 50 may include merchant systems, credit bureau systems, or other systems having data to contribute to the database 60. Exemplary data may include purchase patterns, demographic characteristics, or other information related to potentials targets of marketing campaigns.

The campaign specification system 100 may access data from the database 60 over the network 10, which may in preferred embodiments may be the Internet. The database 60 may be capable of processing billions of records per month and may at any given time store several hundred million records. The database may, for example, be or include a Prospect™ database. Information in the database 60 may include target names and addresses as well as information including, but not limited to income, age, family composition, house type, lifestyle, length of residence, and mail responsiveness. Further information in the database 60 may include spending habits by category and credit data. Each target in the database 60 may additionally have previous promotion history appended to it as well as a channel history, which determines if a target purchased an item over the Internet, or via telephone sales, in person, or through the mail. In preferred embodiments, the database 60 can be updated frequently from appended data and from other sources.

In embodiments of the invention, a percentage of the processed records may be appended to the database 60. If the marketer is a financial services provider, the stored information may include credit cardholder information, credit bureau information, tiles from partners, suppression files from various states, and demographic information.

Figure 1B:
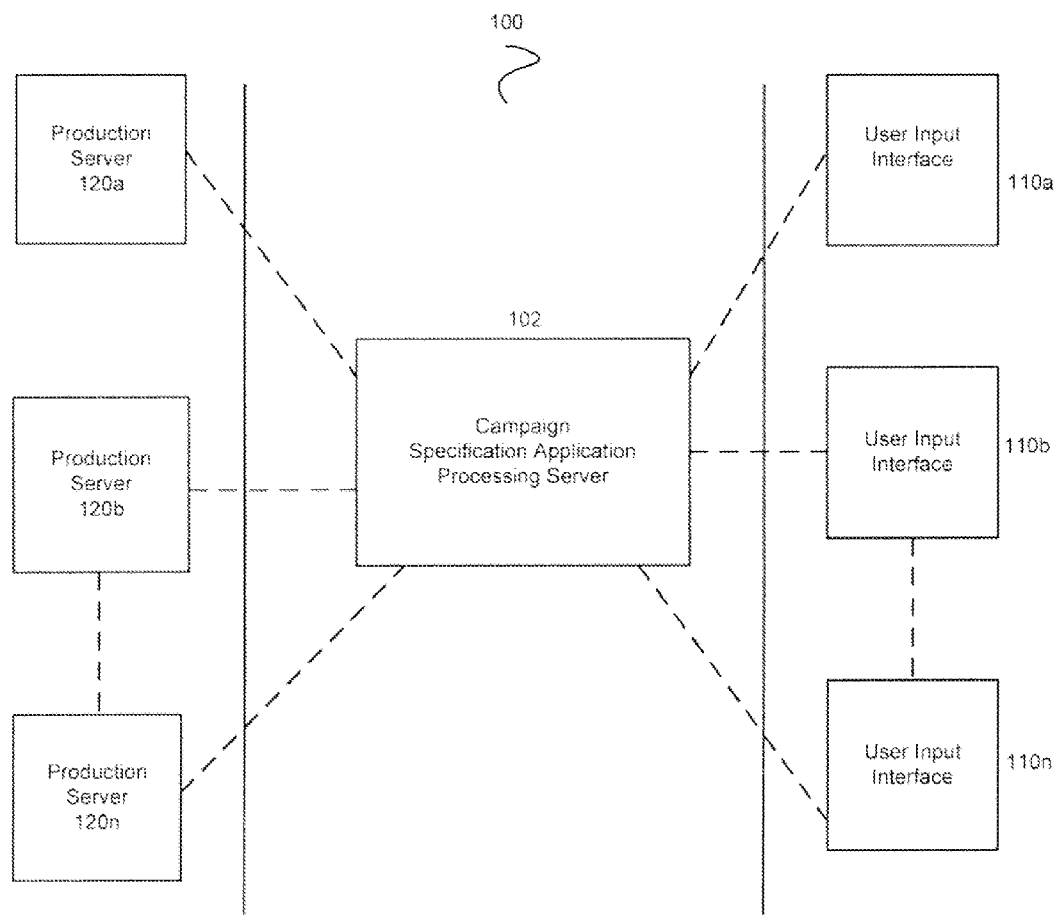
FIG. 1B is a block diagram illustrating a campaign specification system in accordance with an embodiment of the invention.

FIG. 1B is a block diagram illustrating a campaign specification system in accordance with an embodiment of the invention. The campaign specification system 100 may include a campaign specification application processing server 102 that provides multiple user input interfaces 110, 100b . . . 110n, preferably on system user computing devices. The campaign specification application processing server 102 may further be connected with one or more productions servers 120a, 120b . . . 120n. The production servers 120a . . . 120n may create the materials for transmission to the output recipients 40 described above with respect to FIG. 1A.

Figure 2:
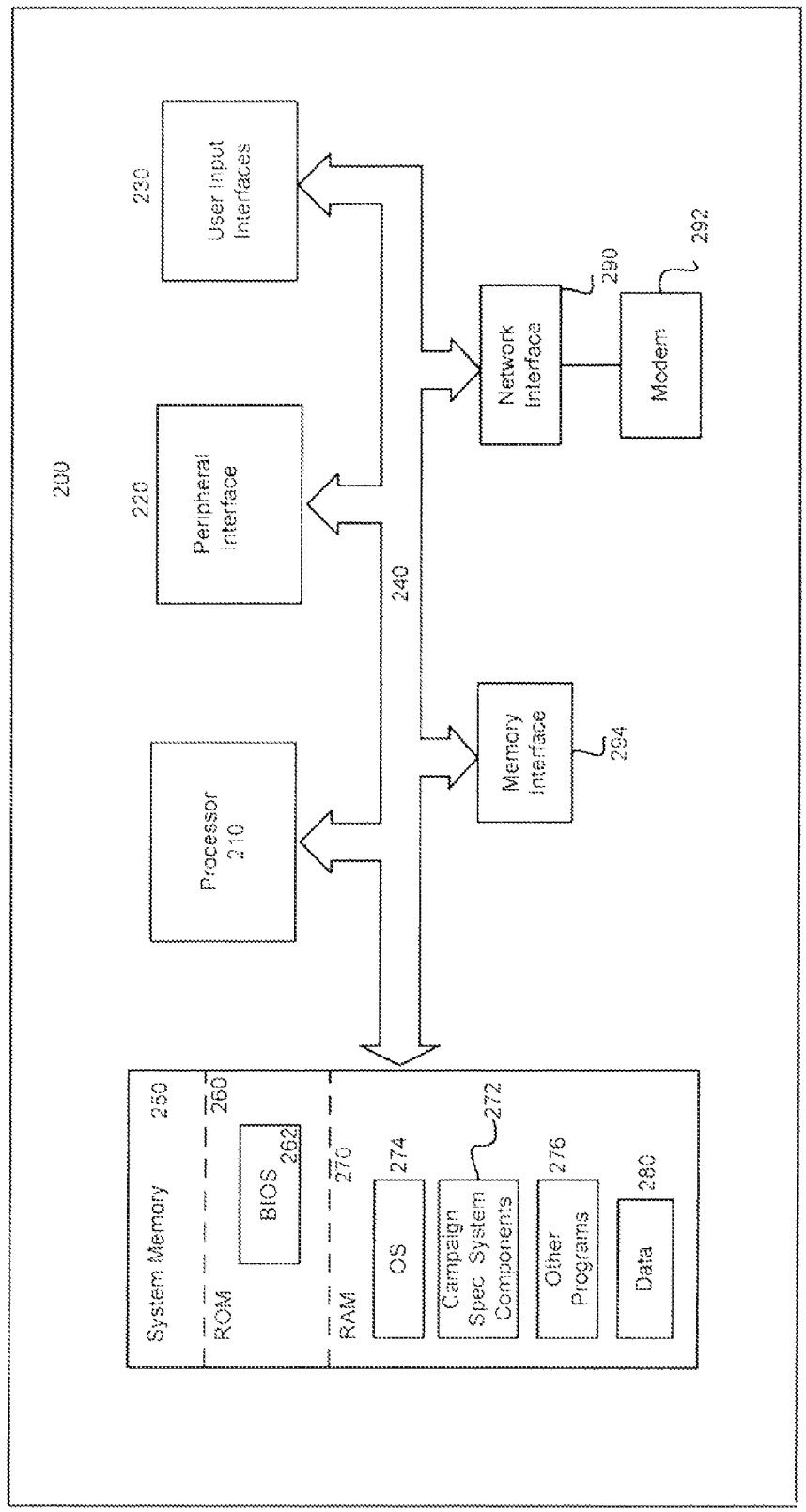
FIG. 2 is a block diagram illustrating a computer system implementing campaign specification system components in accordance with an embodiment of the invention.

FIG. 2 is a block diagram illustrating a computer system 200 implementing campaign specification system components in accordance with an embodiment of the invention. This configuration is merely exemplary and should not be construed as limiting. The computing system 200 may include a processing unit 210, a peripheral interface 220, a user input interface 230, a system bus 240, a system memory 250, a network interface 290, a connected modem 292, and a memory interface 294. The system bus 240 may be provided for coupling the various system components.

Computers typically include a variety of computer readable media that can form part of the system memory and be read by the processing unit. By way of example, and not limitation, computer readable media may comprise computer storage media and communication media. The system memory 250 may include computer storage media in the form of volatile and/or nonvolatile memory such as read only memory (ROM) 260 and random access memory (RAM) 270.

A basic input/output system (BIOS) 262, containing the basic routines that help to transfer information between elements, such as during start-up, is typically stored in ROM 260. RAM 270 typically contains data and/or program modules that are immediately accessible to and/or presently being operated on by processing unit. The data or program modules may include an operating system 274, campaign specification components 272, other program modules 276, and program data 280. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BcOS™ operating system, the Macintosh™® operating system, the Apache™ operating system, an OpenStep™ operating system or another operating system of platform.

At a minimum, the memory 250 includes at least one set of instructions that is either permanently or temporarily stored. The processor 210 executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The campaign specification system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, SQL, SAS, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 210 that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array). RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface 230 that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface 220. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interlace, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Figure 3:
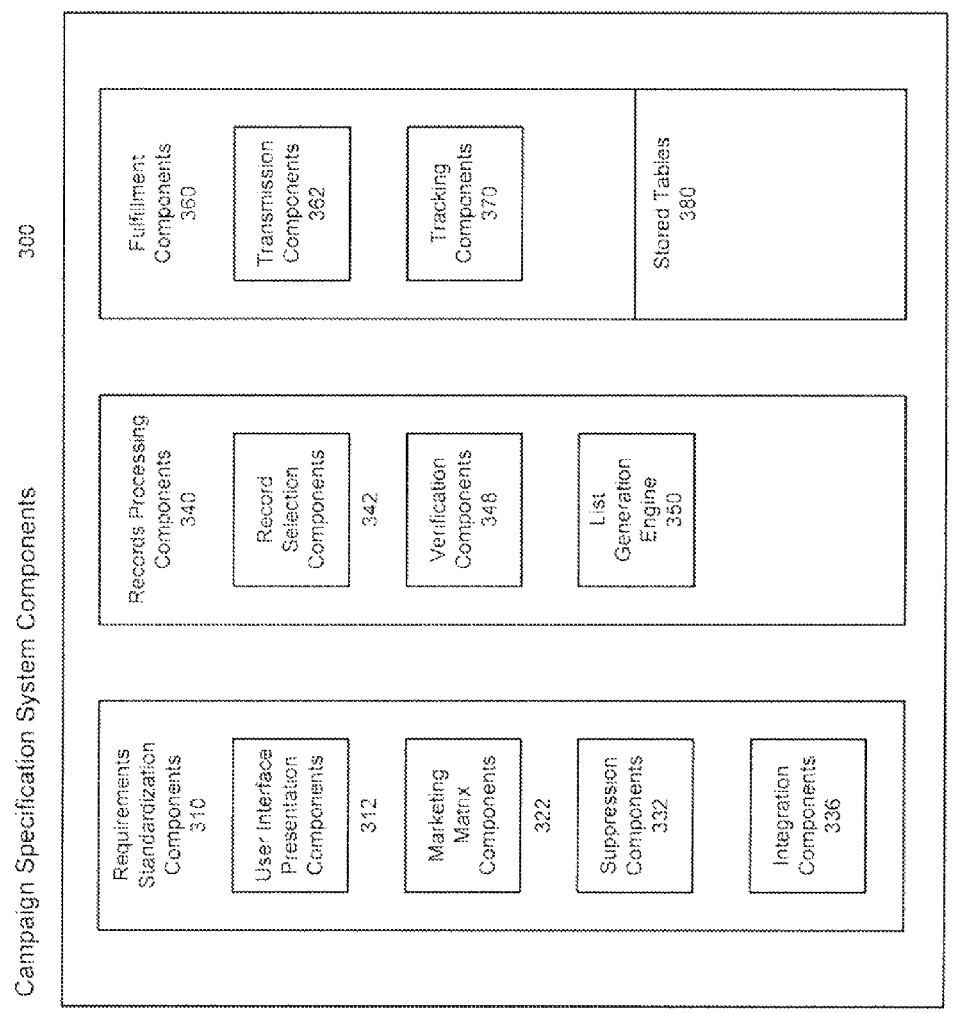
FIG. 3 is a block diagram illustrating campaign specification system components in accordance with an embodiment of the invention.

FIG. 3 is a block diagram illustrating campaign specification system components 300 in accordance with an embodiment of the invention. The campaign specification components may include a requirements standardization engine 310, a records processing components engine 340, and a fulfillment engine 360. These processing engines may be implemented by one or more processing units such as those described above in order to facilitate campaign specification management. The campaign specification system components 300 may further include stored tables 380 accessible to the aforementioned engines.

The requirements standardization engine 310 may include user interface presentation components 312, marketing matrix components 322, suppression components 332, and integration components 336. Understanding of the user interface presentation components 312 is facilitated below by FIGS. 8-20 and accompanying descriptions.

The marketing matrix components 322 facilitate definition of marketing targets by accepting user input through the user interface presentation components 312 and providing criteria for selected targets. In operation, in order to complete a marketing matrix, a marketer might specify a target population using multiple criteria. For example, the marketer might select a population based on geographical region, personal characteristics, demographics, spending habits, or other factors.

The suppression components 332 may be activated to eliminate specified targets based on specific criteria. The suppressions may be selected from stored selectable options, may be entered by the user, or in some instances may be imposed based on existing laws or regulations. Thus, the specific information from the marketing matrix is loaded into the campaign specification system and the system completes suppressions. For instance, the system may want to suppress the population that has already received the mailing in the last month. Furthermore, some states or jurisdictions may prohibit mailing to predetermined individuals.

The integration components 336 may integrate the marketing matrix with the suppressions to provide output to the records processing engine 340. Based on the input marketing matrix and suppressions, the integration components 336 automatically generate record selection code to be implemented by the records processing components 340 in order to extract records from the database.

The records processing engine 340 may include the aforementioned record selection components 342, verification components 348, and list generation components 350. As set forth above, the record selection components 342 may be automatically generated by the integration components 336. Accordingly, once the marketing and suppression information is entered, the system generates code through the integration components 336 to take the entered information and compare it with a table built into the database. The record selection components 342 implement this code to ensure that records that meet the input criteria will go to selection table. The records extracted from the database do not identify individuals by name, but rather by individual IDs.

The record selection components 342 may include the code generated by the integration components 336 that enables automatic selection of records from the database. Both of these components may operate automatically without operator invention in the absence of special instructions that are further described below. The record selection components 342 thus automatically build a selection table from records extracted from the database.

The verification components 348 run a verification process on a generated selection table. The verification components 348 may then run a series of reports validating the selection process. If the selections are approved, the system may perform last minute suppressions. After all of these are applied, the system goes into tables and picks out names and addresses by matching the individual IDs found for each person.

If the selection table fails verification, the records processing engine 340 returns the process to the standardization requirements engine 310. The list generation engine 350 generates the output list after the list has been verified.

The fulfillment engine 360—may include transmission components 362, and tracking components 370. The fulfillment engine 360 may operate to distribute output through appropriate channels.

The transmission components 362 of the fulfillment engine may generates a file of names and addresses and transmit the file, while the tracking components 370 implement response tracking. Output recipients may be matched with output marketing materials in order to ensure distribution. In the fulfillment stage, the system then generates a file of names and addresses. The output lists may also include seed names, which are names of marketing supply stores want to include in mailing list to ensure mail was sent out with proper offer. Other output may include a file that goes to the print vendor so that the print vendor is able to print names and address on fulfillment piece. The system may send out another file that goes to inbound telemarketing company, because any mail piece that goes out has the option of an inbound call.

Through the use of the fulfillment components 360 of the campaign specification system, an organization can track responses and match with predictions. Furthermore the system facilitates root cause analysis to determine the cause of undesired results. The system creates all data files for various sites including telemarketing vendors, letter shops, credit bureau, contact history files. The fulfillment components are able to creates a layout in a desired order and automate execution, formatting, and shipping.

The stored tables 380 may include a contact history table. Through the use of the campaign specification system components 300, a search can be conducted on name and address and invitation/solicitation number to go back and find the exact piece that went out. This can be accomplished through the contact history table 380. Contact history allows tracking of how many people had responded and the nature of each response.

Although the aforementioned components are shown as discrete modules, each of the modules may alternatively be integrated with one another. If the modules are discrete, multiple modules may operate cooperatively as will be further explained below.

Figure 4:
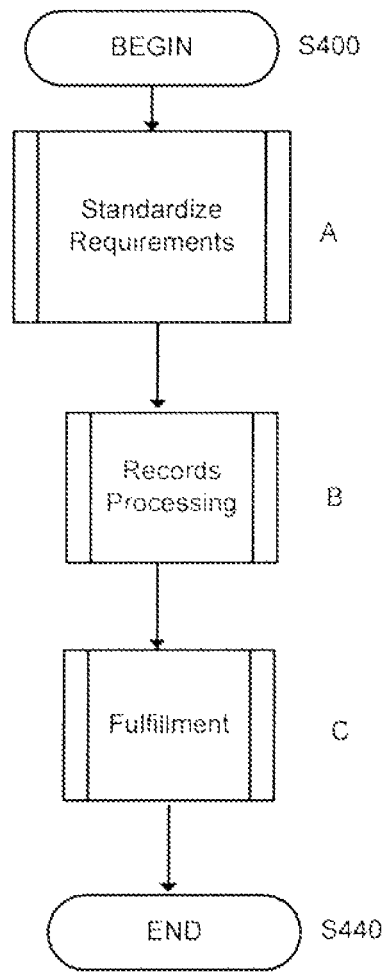
FIG. 4 is a flow chart illustrating campaign management procedures in accordance with an embodiment of the invention.

FIG. 4 is a flow chart illustrating campaign management procedures 400 in accordance with an embodiment of the invention. In procedure A, the standardization engine sets the standardization requirements. In procedure B, the records processing engine 340 processes information to generate a campaign list. In procedure C, the fulfillment engine 360 executes fulfillment procedures. Furthermore, in embodiments of the invention, manual intervention is permitted for one or more of the three major operations performed. The system can be customized so that any selected steps may be performed manually and any selected steps may be performed automatically. The steps involved in each of procedures A, B, and C are more fully described below.

Figure 5:
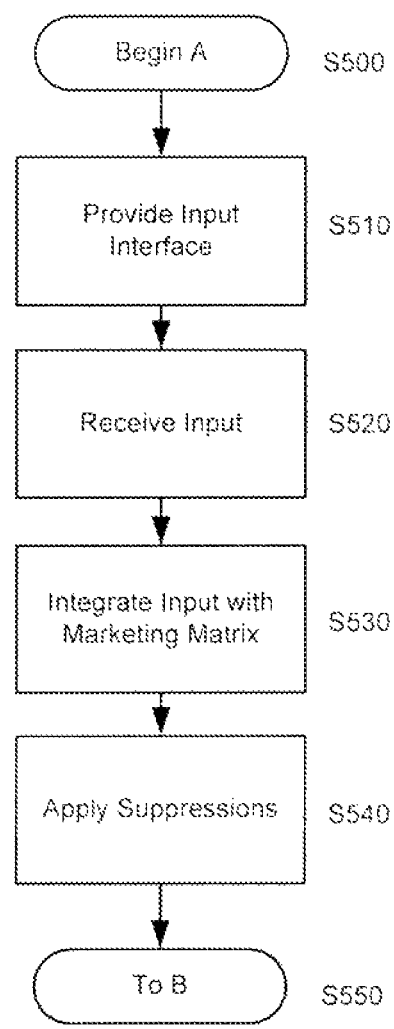
FIG. 5 is a flow chart illustrating a method for standardizing requirements during a marketing campaign in accordance with an embodiment of the invention.

FIG. 5 is a flow chart illustrating a method for standardizing requirements (procedure A) during a marketing campaign in accordance with an embodiment of the invention. The method begins in S500 and the system provides an input interface in S510. In 520, the system receives user input. For example, a campaign manager may want to market a new product to everyone who lives in a particular state, who has spent a threshold amount of money in the last month in a particular category, and is a frequent flier on a particular airline. This information can be extracted from the database described herein. The information that comes from the marketing matrix may further include cell codes, price points, tests, quantity of records, letter shop identifier, state, money spent, time period, etc. This specific information is loaded into the campaign specification system in S520.

Upon receiving the user input, the system integrates the user input with the marketing matrix in S530. In S540, the system applies suppressions. For example, in the state of Connecticut, the system may be prohibited from mailing between two and six AM. The system may further implement restrictions on mailing for two consecutive months. In this instance, the system would extract the previous month's mailing files and suppress those records. Customers of a particular partner may also be suppressed. For instance, if no United Airlines customers should be included, these records will be suppressed. Suppressions may also be implemented based on unique characteristics of person, such as physical characteristics, age, gender, etc. The system moves to procedure B in S550.

As will be more fully explained below, the integrated marketing matrix file contains cell-specific data for a campaign, including selection logic, cell level suppression instructions, seed information, optimized data, and letter shop information.

Figure 6:
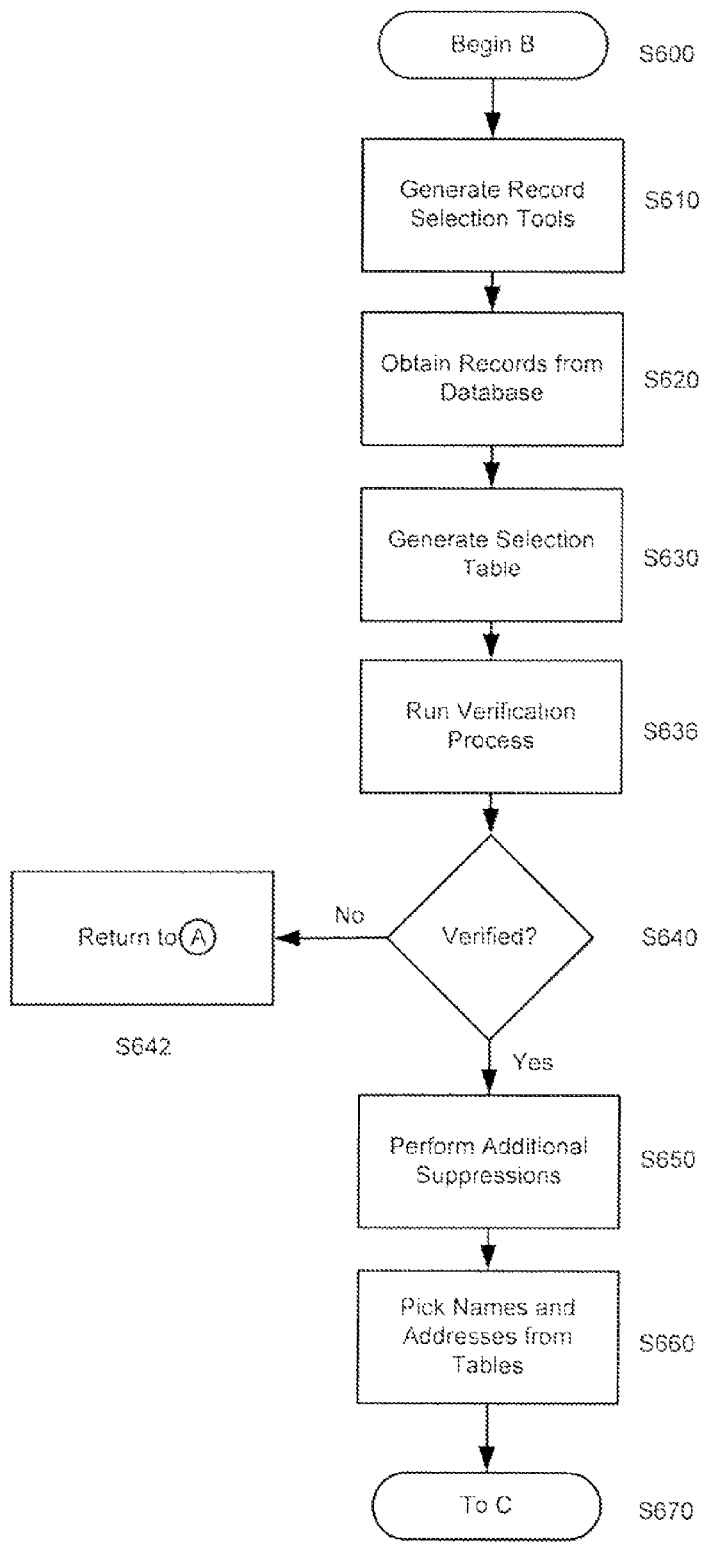
FIG. 6 is a flow chart illustrating a method for record selection in accordance with an embodiment of the invention.

FIG. 6 is a flow chart illustrating a method for record selection in accordance with an embodiment of the invention. The method begins in S600. In S610, the system generates record selection tools based on the marketing matrix and applied suppressions. In S620, the records processing engine obtains records from the database. In 630, the system generates a selections table by comparing received information against the table built into the database. Records that meet the input criteria will go to selection table. At this point, the records extracted from the database include individual IDs rather than names and addresses.

The system runs a verification process in S636. The verification process 636 may include a series of reports validating that the selection was accomplished correctly. Some of the reports may be standard and others may be non-standard. If the selection table fails verification in S640, the records processing engine returns the process to the standardization requirements engine. If the selection table passes verification in S640, the system performs additional suppressions in S650. For example, if the offer is to be mailed to recipients pre-approved for a credit card, last minute credit bureau suppressions may be required.

In S660, the records processing components pick names and addresses from the tables based on the individual IDs extracted from the database and moves to procedure C in S670.

Figure 7:
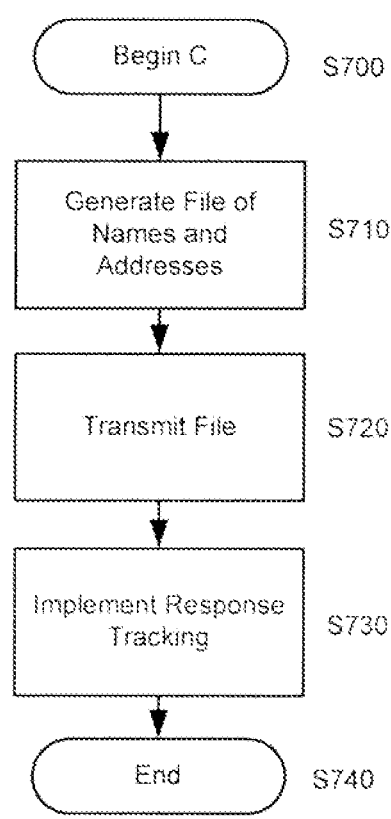
FIG. 7 is a flow chart illustrating a method for generating a campaign list in accordance with an embodiment of the invention.

FIG. 7 is a flow chart illustrating a method for generating a campaign list in accordance with an embodiment of the invention. The method begins in S700 and the fulfillment engine generates required files including a file of names and addresses in S710. The fulfillment engine transmits the file in S720 and implements response tracking in S730. The method ends in S740.

The file generated in S710 may include seed names, which are names of marketing supply stores for inclusion in mailing list to ensure mail was sent out with proper offer. A file for transmission to a print vendor is provided so that the print vendor is able to print name and address on fulfillment piece. Another file may be transmitted to an inbound telemarketing company, because any mail piece that goes out has the option of an inbound call and the inbound vendor should have the same names and addresses as print shop.

The response tracking of S730 may implement a series of verification reports that files were created accurately to requirements specified. Responses may be tracked and matched with predictions. The contact history table described above with respect to FIG. 3 can facilitate root cause analysis. Searches can be accomplished through a name and address and invitation/solicitation number to go back and find the exact piece that was transmitted. Contact history allows tracking of how many people had responded, what they wanted etc. and can further verify recent offers and amount of offers.

The campaign specification document created with the system provides the selection instructions for a marketing program as communicated by the campaign managers having access to the system. In preferred embodiments, the campaign specification document is uploaded into the system from two separate .CSV files: including a marketing matrix file and a preliminary suppressions file. These two files are zipped together and loaded through the systems GUI upload function, which is further described below. A process of creating these files is described below with reference to FIG. 8.

Figure 8:
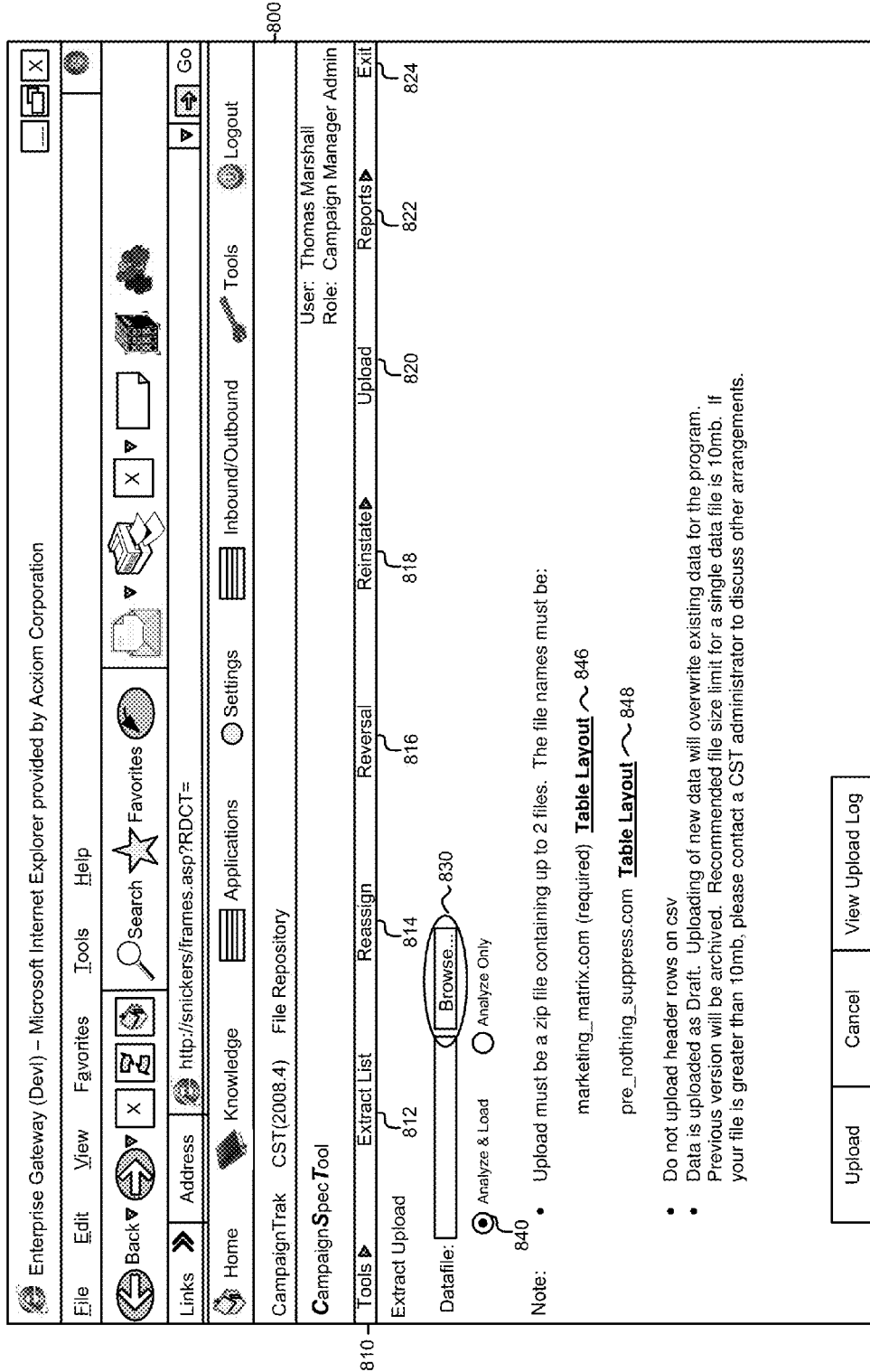
FIG. 8 illustrates a user interface for uploading requirements in accordance with an embodiment of the invention.

FIG. 8 illustrates a user interlace 800 for uploading requirements in accordance with an embodiment of the invention. After the user logs into the system, in order to initiate the process, the user selects an upload tab 820 on a tab list 810. By selecting a marketing matrix table layout option 846 located centrally on user interface 800, a user can open a window containing a marketing matrix layout.

The tab list 810 of the user interface 800 preferably includes multiple selectable options such as extract list 812, reassign 814, reversal 816, reinstate 818, upload 820, reports 822 and exit 824. The user interface 800 also includes a browse option 830 for locating a file and load or analyze options 840. An upload option 850 may also be provided for uploading data entered on the user interface 850. A table layout option 848 is available for viewing suppressions.

As set forth above, selection of the upload option 820 from an initial screen (not shown) brings up the user interface 800. Selecting the table layout option 846 for bringing up the marketing matrix will open a window containing the marketing matrix layout. The layout can be configurable through a spreadsheet such as Microsoft Excel spreadsheet. A spreadsheet having the column headers as shown below in Table 1 may be populated.

TABLE 1

| COLUMN HEADER | DESCRIPTION |
|---|---|
| CELL_CODE | |
| CHANNEL | Nthing Channel Used (DM, TM, CS, OE, OP) |
| NS_NAMEs | Name Source NameRO Number, Numeric only |
| | OFFER used for Selection Criteria (PA, FA, LP, SP, UA, US, ZZ)Name |
| NTHING_OFFER_TYPEsNS_NAMEs | Source Name |
| | CAP, ALL, SPLIT; must be capitalizedOFFER used for Selection Criteria |
| NTHING_TYPE_NMNTHING_OFFER_TYPEs | (PA, FA, LP, SP, UA, US, UZ, ZZ) |
| | Minimum Number of Acceptable Records, Numeric only CAP, ALL, |
| NTHING_MIN_NBNTHING_TYPE_NM | SPLIT; must be capitalized |
| NTHING_MAX_NBNTHING_MIN_NB | Maximum Number of Acceptable Records, Numeric onlyMinimum Number of Acceptable Records, Numeric only |
| NTHING_MISC_CUT_COL_1_NMPTNR_PRS_MISC_ INFO_TX | Cell Level Nthing Column, to be selected from the CUT table columnsBalance / Mileage add Value, Numeric only |
| NTHING_MISC_CUT_OPER_1_ CDNTHING_MISC_CUT_COL_1_NM | Operator to be used with Associated Cut Column and Values: EQ, NE, LT, GT, LE, GECell Level Nthing Column, to be selected from the CUT table columns |
| NTHING_MISC_CUT_VAL_1_DESC_TX (can be pipe delim)NTHING_MISC_CUT_OPER_1_CD | Values to he used with Associated Cut ColumnOperator to be used with Associated Cut Column and Values; EQ, NE, LT, GT, LE, GE |
| NTHING_MISC_CUT_COL_2_NMNTHING_MISC_CUT_ VAL_1_DESC_TX (can be pipe delim) | Cell Level Nthing Column, to be selected from the CUT table columnsValues to be used with Associated Cut Column |
| NTHING_MISC_CUT_OPER_2_ CDNTHING_MISC_CUT_COL_2_NM | Operator to be used with Associated Cut Column and Values; EQ, NE, LT, GT, LE, GECell Level Nthing Column, to be selected from the CUT table columns |

TABLE 1-continued

| COLUMN HEADER | DESCRIPTION |
|---|---|
| NTHING_MISC_CUT_VAL_2_DESC_TX (can be pipe delim)NTHING_MISC_CUT_OPER_2_CD | Values to be used with Associated Cut ColumnOperator to be used with Associated Cut Column and Values; EQ, NE, LT, GT, LE, GE |
| NTHING_MISC_CUT_COL_3_NMNTHING_MISC_CUT_VAL_2_DESC_TX (can be pipe delim) | Cell Level Nthing Column, to be selected from the CUT table columnsValues to be used with Associated Cut Column |
| NTHING_MISC_CUT_OPER_3_CDNTHING_MISC_CUT_COL_3_NM | Operator to be used with Associated Cut Column and Values; EQ, NE, LT, GT, LE, GECell Level Nthing Column, to be selected from the CUT table columns |
| NTHING_MISC_CUT_VAL_3_DESC_TX (can be pipe delim)NTHING_MISC_CUT_OPER_3_CD | Values to be used with Associated Cut ColumnOperator to be used with Associated Cut Column and Values; EQ, NE, LT, GT, LE, GE |
| NTHING_MISC_CUT_COL_4_NMNTHING_MISC_CUT_VAL_3_DESC_TX (can be pipe delim) | Cell Level Nthing Column, to be selected from the CUT table columnsValues to be used with Associated Cut Column |
| NTHING_MISC_CUT_OPER_4_CDNTHING_MISC_CUT_COL_4_NM | Operator to be used with Associated Cut Column and Values; EQ, NE, LT, GT, LE, GECell Level Nthing Column, to be selected from the CUT table columns |
| NTHING_MISC_CUT_VAL_4_DESC_TX (can be pipe delim)NTHING_MISC_CUT_OPER_4_CD | Values to be used with Associated Cut ColumnOperator to be used with Associated Cut Column and Values; EQ, NE, LT, GT, LE, GE |
| NTHING_MISC_CUT_COL_5_NMNTHING_MISC_CUT_VAL_4_DESC_TX (can be pipe delim) | Cell Level Nthing Column, to be selected from the CUT table columnsValues to be used with Associated Cut Column |
| NTHING_MISC_CUT_OPER_5_CDNTHING_MISC_CUT_COL_5_NM | Operator to be used with Associated Cut Column and Values; EQ, NE, LT, GT, LE, GECell Level Nthing Column, to be selected from the CUT table columns |
| NTHING_MISC_CUT_VAL_5_DESC_TX (can be pipe delim)NTHING_MISC_CUT_OPER_5_CD | Values to be used with Associated Cut ColumnOperator to be used with Associated Cut Column and Values; EQ, NE, LT, GT, LE, GE |
| NTHING_MISC_CUT_COL_6_NMNTHING_MISC_CUT_VAL_5_DESC_TX (can be pipe delim) | Cell Level Nthing Column, to be selected from the CUT table columnsValues to be used with Associated Cut Column |
| NTHING_MISC_CUT_OPER_6_CDNTHING_MISC_CUT_COL_6_NM | Operator to be used with Associated Cut Column and Values; EQ, NE, LT, GT, LE, GECell Level Nthing Column, to be selected from the CUT table columns |
| NTHING_MISC_CUT_VAL_6_DESC_TX (can be pipe delim)NTHING_MISC_CUT_OPER_6_CD | Values to be used with Associated Cut ColumnOperator to be used with Associated Cut Column and Values; EQ, NE, LT, GT, LE, GE |
| NTHING_MISC_CUT_COL_7_NMNTHING_MISC_CUT_VAL_6_DESC_TX (can be pipe delim) | Cell Level Nthing Column, to be selected from the CUT table columnsValues to be used with Associated Cut Column |
| NTHING_MISC_CUT_OPER_7_CDNTHING_MISC_CUT_COL_7_NM | Operator to be used with Associated Cut Column and Values; EQ, NE, LT, GT, LE, GECell Level Nthing Column, to be selected from the CUT table columns |
| NTHING_MISC_CUT_VAL_7_DESC_TX (can be pipe delim)NTHING_MISC_CUT_OPER_7_CD | Values to be used with Associated Cut ColumnOperator to be used with Associated Cut Column and Values; EQ, NE, LT, GT, LE, GE |
| NTHING_MISC_CUT_COL_8_NMNTHING_MISC_CUT_VAL_7_DESC_TX (can be pipe delim) | Cell Level Nthing Column, to be selected from the CUT table columnsValues to be used with Associated Cut Column |
| NTHING_MISC_CUT_OPER_8_CDNTHING_MISC_CUT_COL_8_NM | Operator to be used with Associated Cut Column and Values; EQ, NE, LT, GT, LE, GECell Level Nthing Column, to be selected from the CUT table columns |
| NTHING_MISC_CUT_VAL_8_DESC_TX (can be pipe delim)NTHING_MISC_CUT_OPER_8_CD | Values to be used with Associated Cut ColumnOperator to be used with Associated Cut Column and Values; EQ, NE, LT, GT, LE, GE |
| NTHING_MISC_CUT_COL_9_NMNTHING_MISC_CUT_VAL_8_DESC_TX (can be pipe delim) | Cell Level Nthing Column, to be selected from the CUT table columnsValues to be used with Associated Cut Column |
| NTHING_MISC_CUT_OPER_9_CDNTHING_MISC_CUT_COL_9_NM | Operator to be used with Associated Cut Column and Values; EQ, NE, LT, GT, LE, GECell Level Nthing Column, to be selected from the CUT table columns |
| NTHING_MISC_CUT_VAL_9_DESC_TX (can be pipe delim)NTHING_MISC_CUT_OPER_9_CD | Values to be used with Associated Cut ColumnOperator to be used with Associated Cut Column and Values; EQ, NE, LT, GT, LE, GE |
| NTHING_MISC_CUT_COL_10_NMNTHING_MISC_CUT_VAL_9_DESC_TX (can be pipe delim) | Cell Level Nthing Column, to be selected from the CUT table columnsValues to be used with Associated Cut Column |
| NTHING_MISC_CUT_OPER_10_CDNTHING_MISC_CUT_COL_10_NM | Operator to be used with Associated Cut Column and Values; EQ, NE, LT, GT, LE, GECell Level Nthing Column, to be selected from the CUT table columns |
| NTHING_MISC_CUT_VAL_10_DESC_TX (can be pipe delim)NTHING_MISC_CUT_OPER_10_CD | Values to be used with Associated Cut ColumnOperator to be used with Associated Cut Column and Values; EQ, NE, LT, GT, LE, GE |

After creation, the marketing matrix file should be saved. In embodiments of the invention, the marketing matrix file may be required to be saved specifically as marketing matrix file in order to later be combined with suppressions.

Subsequently, a user may add suppressions. To initiate the creation of a suppressions file, the user may select the table layout 848 option as shown in FIG. 8.

After a user enters all of the headers into the spreadsheet, the system populates the appropriate values for each column, for example, using the description criteria shown in Table 2 below.

TABLE 2

| Column Header | Description |
|---|---|
| PROG_ID | |
| EXTRACT_NB | |
| SPRS_TYPE_CD | TJ, PAFA, DNS, ST, MCIF |
| SPRS_ORDR_NB | Suppression Order, Numeric only |
| INCLUDE_EXCLUDE | I (Inclusion) or E (Exclusion) |
| SCHEMA_NM | Owner of Table |
| TABLE_NM | TABLE_NAME |
| MATCH_KEY | Pipe Delimited |
| SPRS_PROG_ID | |
| SPRS_EXTRACT_NB | |
| NS_NAME | Pipe Delimited |
| STATE_CD | State - Pipe Delimited |
| WEEK | Optimized Week, Numeric only |

The user may request that the system store preliminary suppressions in file. The preliminary suppressions are defined as campaign level suppression data, including: pre-approved/full application suppression data, retail suppression information, partner names. State suppressions, and ad hoc table suppressions. These preliminary suppressions are applied to either the entire campaign population or to large partner sections of the campaign population.

When the campaign specification values are entered for each column, the user may be given the opportunity to review the document to insure that all campaign specific data are included. If a circumstance arises in which a campaign does not require preliminary suppressions, the creation of the preliminary suppressions file is not necessary.

Assuming that preliminary suppressions are necessary, a user, having saved both the marketing matrix file and the preliminary suppressions file, may link the files, for example by zipping the tiles together.

In order to upload a campaign specification document from created marketing matrix and suppression files, a system user would select the browse option 830 and identify the created file that combines the marketing matrix and suppressions.

Figure 9:
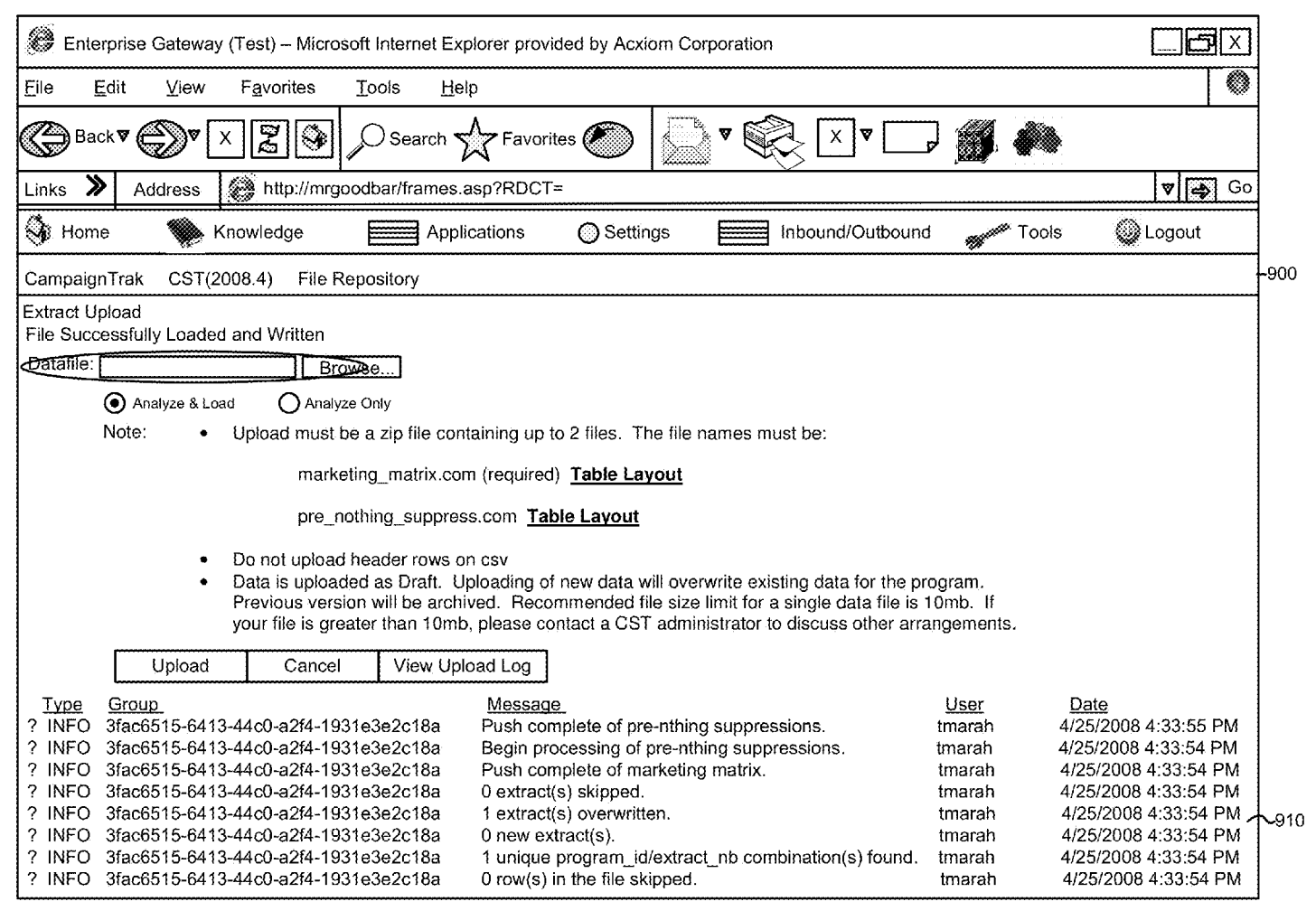

With reference to user interface 900 of FIG. 9, once the combined campaign specification file is located and is displayed in browse box 930, the user may upload the file by selecting an upload button 950. FIG. 9 illustrates the user interface 900 that may be displayed in accordance with an embodiment of the invention when the user uploads a created campaign specification document. User interface 900 includes an area 910 that displays both successful loads and errors and is further illustrated in FIG. 10.

FIG. 10 is a user interface 1000 illustrating upload records 1040 in accordance with an embodiment of the invention. The upload records 1040 may be listed by type 1002, group 1004, message 1006, user 1008, and date 1012. Available options upon viewing of the upload errors 1040 may include an upload option 1010, a view upload log option 1020, and a cancel option 1030. The message section 1006 may contain an explanation of any existing errors. If no errors occur, the user may proceed, but if errors are encountered, the appropriate saved file should be corrected and both files should be re-zipped and re-loaded. Once corrected, in embodiments of the invention, uploading the same program ID/extract number overwrites the original data within the system When the marketing matrix and preliminary suppression files are loaded into the system, the user can access the actual campaign specification document and populate the remaining campaign instruction data. Once the required fields across the remaining tabs are populated, the user can submit the campaign for either automated or manual runs though the campaign execution and campaign fulfillment processes.

Figure 11:
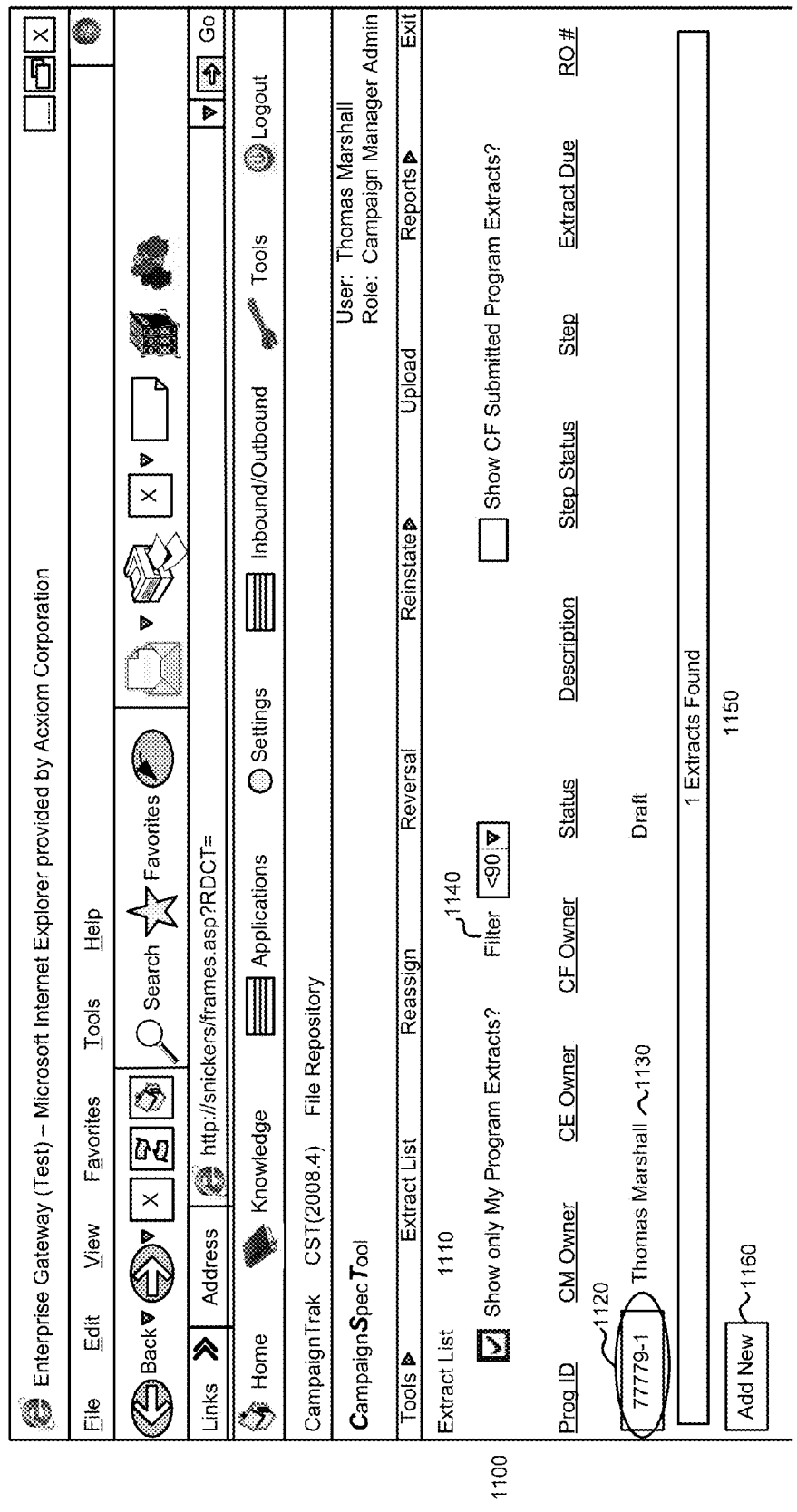
FIG. 11 illustrates an extract list user interface in accordance with an embodiment of the invention.

FIG. 11 illustrates an extract list user interface 1100 in accordance with an embodiment of the invention. The extract list user interface 1100 may be reached, for example, by selection of an extract list tab 1100 shown in FIG. 8. The user interface 1100 lists every campaign owned by the user currently logged in and the status of each campaign. As more users with other roles, such as campaign execution (CE) and campaign fulfillment (CF) are assigned to this campaign, the system tool displays their user IDs accordingly. All campaigns report being in Draft Status until the CM submits it for CE and CF processing.

As set forth above, the extract list user interface 1100 may appear upon selection of the extract list option 1100 from the menu bar 1102. List results may be provided for example by program ID 1120 and campaign owner 1130. A filter option 1140 may be provided for determining a number of viewable results. An indicator 1150 may provide the number of results found. Other information for each record in the list may include CE owner, CF owner, status, description, step status, step, due date and roll out (RO) number. By selecting an option 1160, users are able to add new records to the list. Selection of the program ID)/extract number 1120 opens an extract detail page of the campaign.

Figure 12:
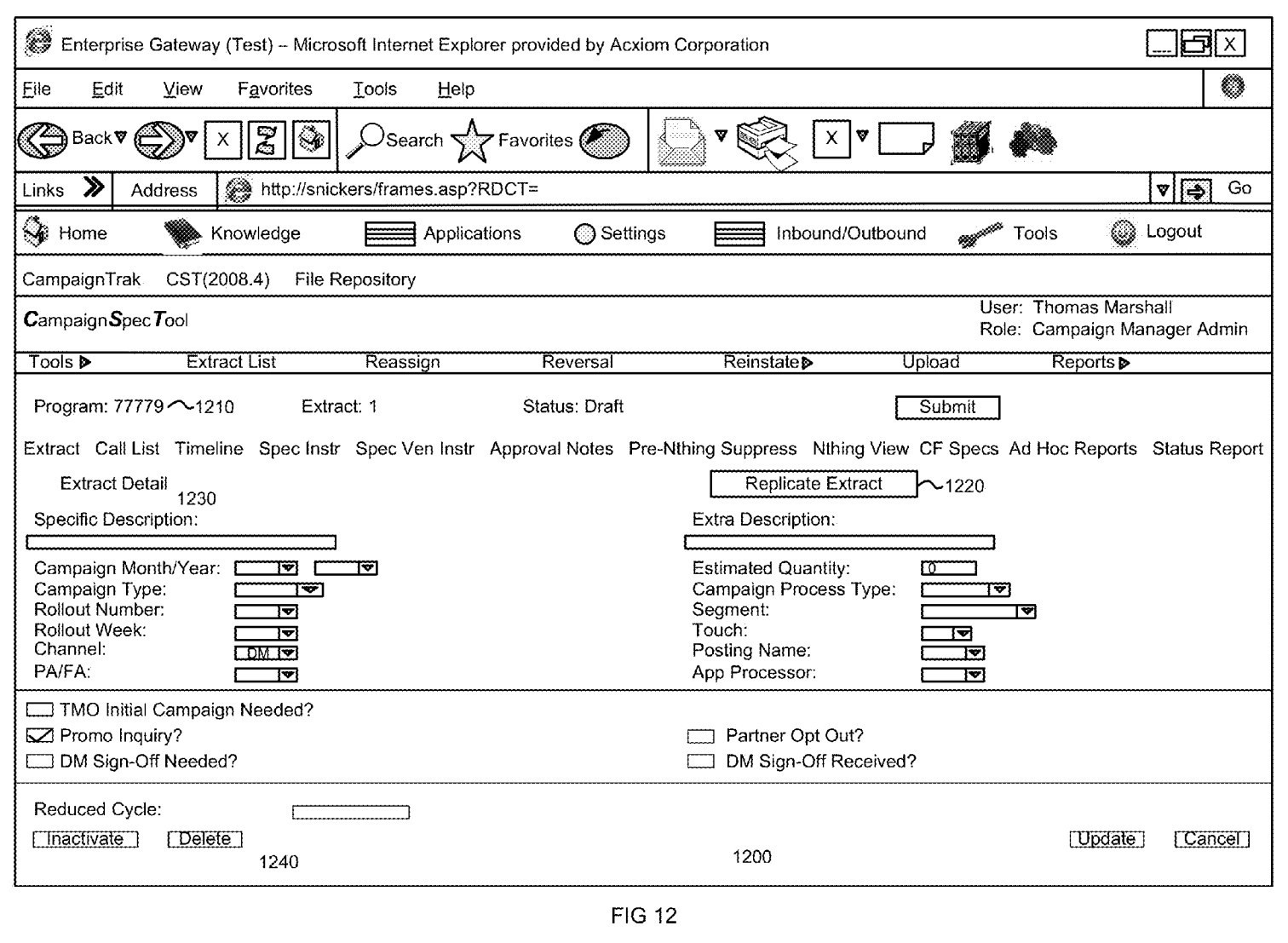

FIG. 12 illustrates an extract detail user interface 1200 in accordance with an embodiment of the invention. In order to populated the user interface 1200, a campaign manager may step through each column of an extract detail section 1230 and enter preferred values or select preferred values from the drop-down menus shown. To save selected values, users must select an update button 1250. An exemplary field that may be included is campaign month/year, 1212, which represents the actual campaign mail month and year. Campaign types 1214 may include multiple levels of information such as: $1^{st}$ Byte: B—Brands, P—Partner; $2^{nd}$ Byte: P—PA (Pre-Approved), F—FA (Full Application); $3^{rd}$ Byte: M—Direct Mail, T—Telemarketing, E—Email/Internet; $4^{th}$ Byte: C—Consumer, B—Small Business; and $5^{th}$ Byte: C—Core, M—Manual PRM, T—Credit Trigger.

Figure 13:
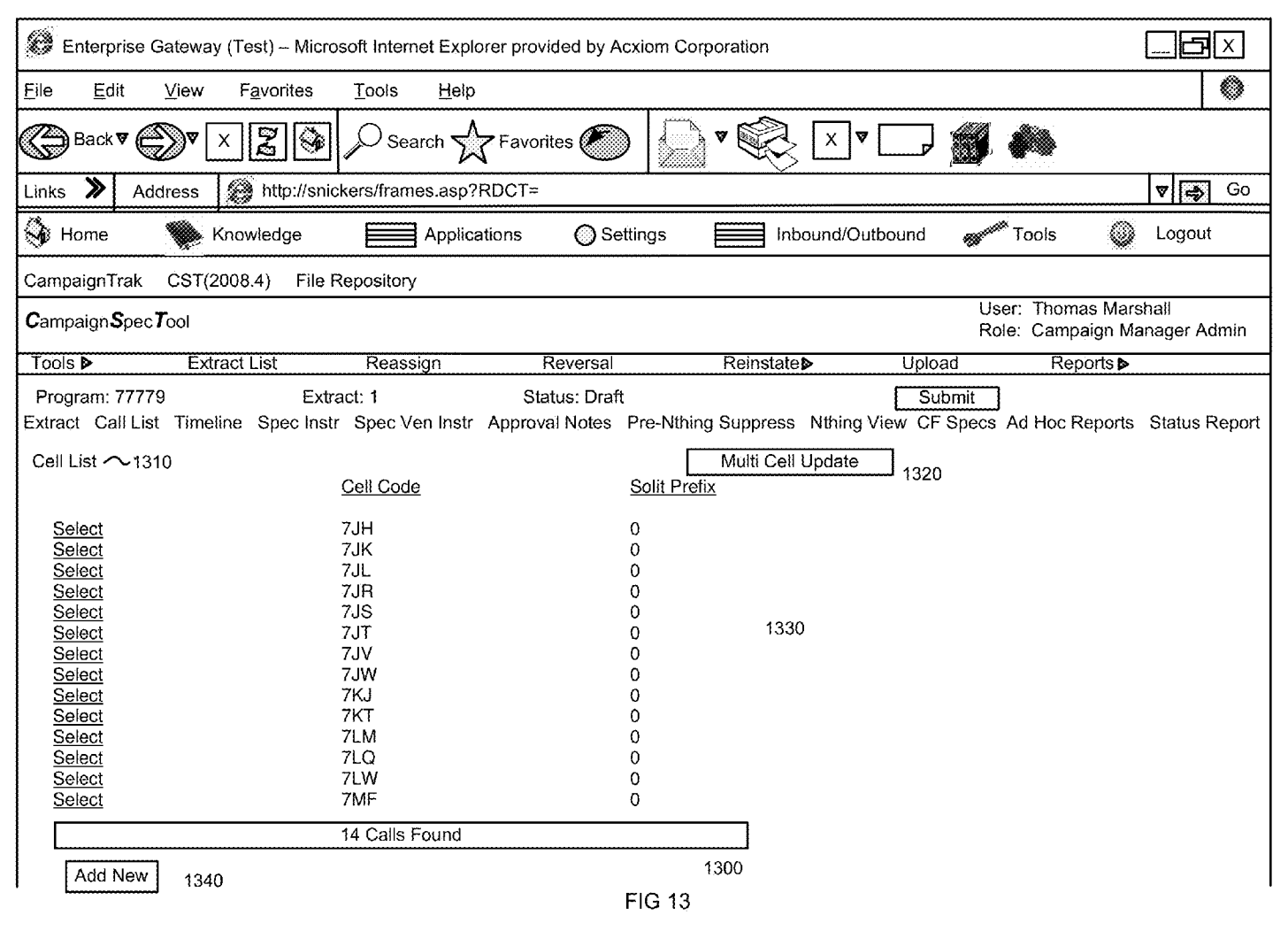

FIG. 13 illustrates a cell list user interface 1300 in accordance with an embodiment of the invention. The cell list user interface 1300 may appear upon selection of cell list 1312 from tab menu 1302. Cell list user interface 1300 may include a cell list 1310, containing a listing of cell codes and prefixes 1330. The user interface 1300 may include a multi cell update option 1320 and an add new option 1340. Through the cell list user interface 1300, a campaign manager can conduct a multi-cell update for most of the fields. Selecting a link for a particular cell code will open a cell detail user interface 1400 for that cell.

Figure 14:
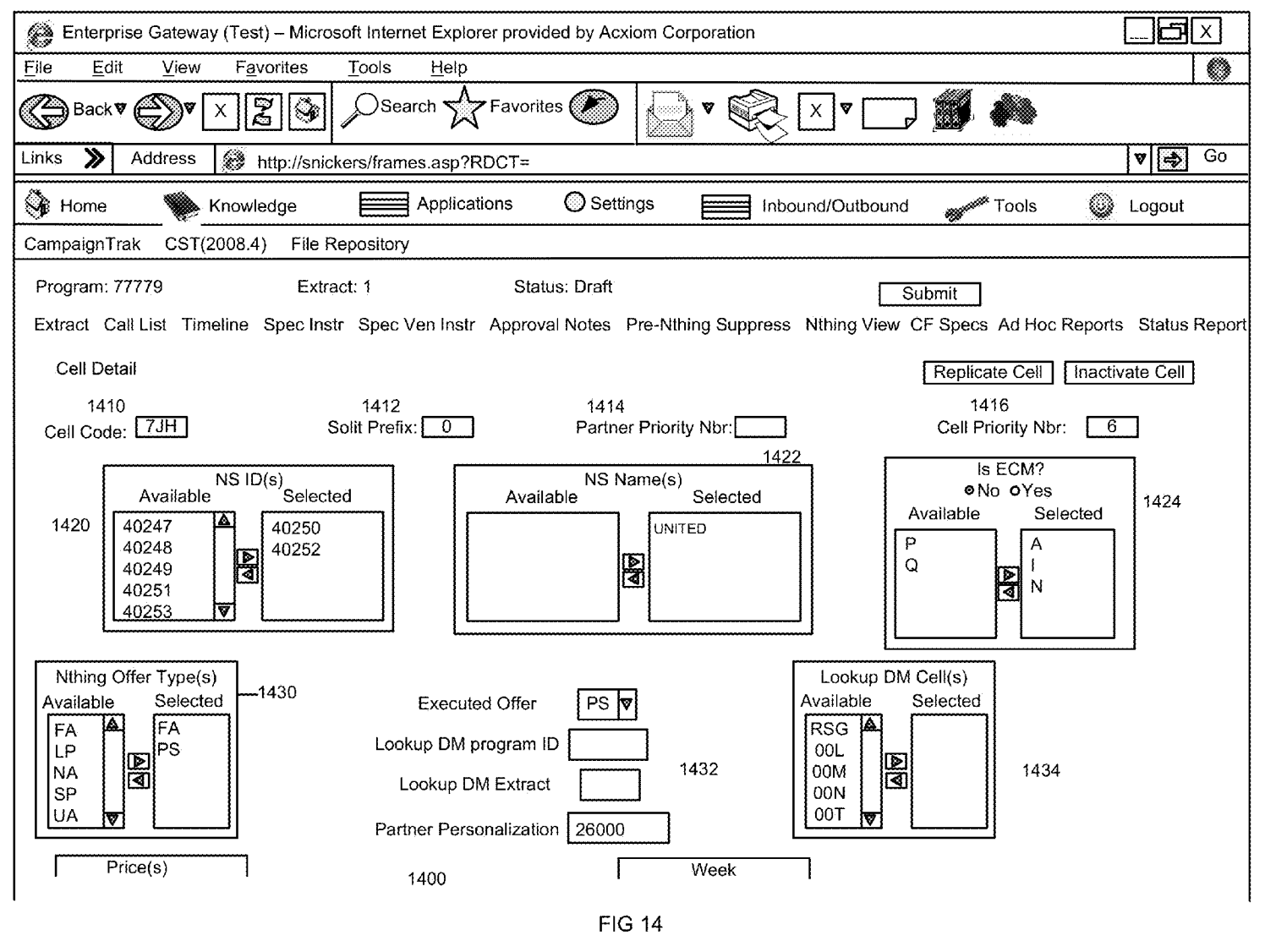

FIG. 14 illustrates the cell detail user interface 1400 in greater detail. The cell detail user interface 1400 may list the cell code in space 1410, prefix at 1412, partner priority number 1414, cell priority number 1416, IDs 1420, names 1422, flags 1424, suppression types 1430, and lookup options 1432 and 1434. The data loaded from the marketing matrix and suppression files displays within each particular Cell Code.

Figure 15:
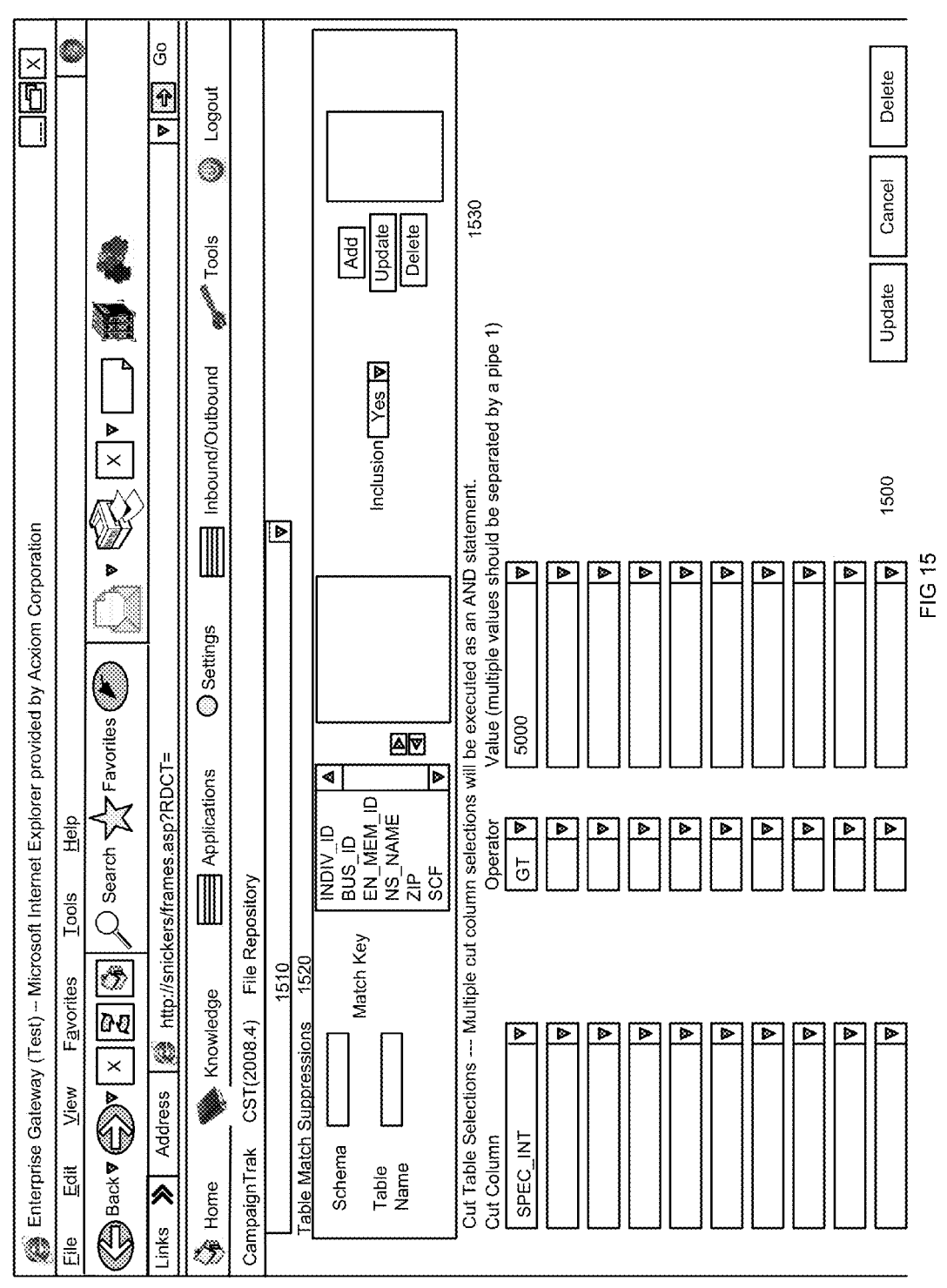

FIG. 15 illustrates a user interface 1500 for displaying suppressions in accordance with an embodiment of the invention. The page may include special instructions section 1510, table match suppressions 1520, and cut table sections 1530. Operator values for the Cut Fable Selections may include: EQ—Equal to, NE—Not Equal, GT—Greater Than, LT—Less Than, GE—Greater Than or Equal to, LE—Less Than or Equal to, Information on this page can be changed or updated prior to submission of the campaign by revising the information and selecting update option 1540.

Figure 16:
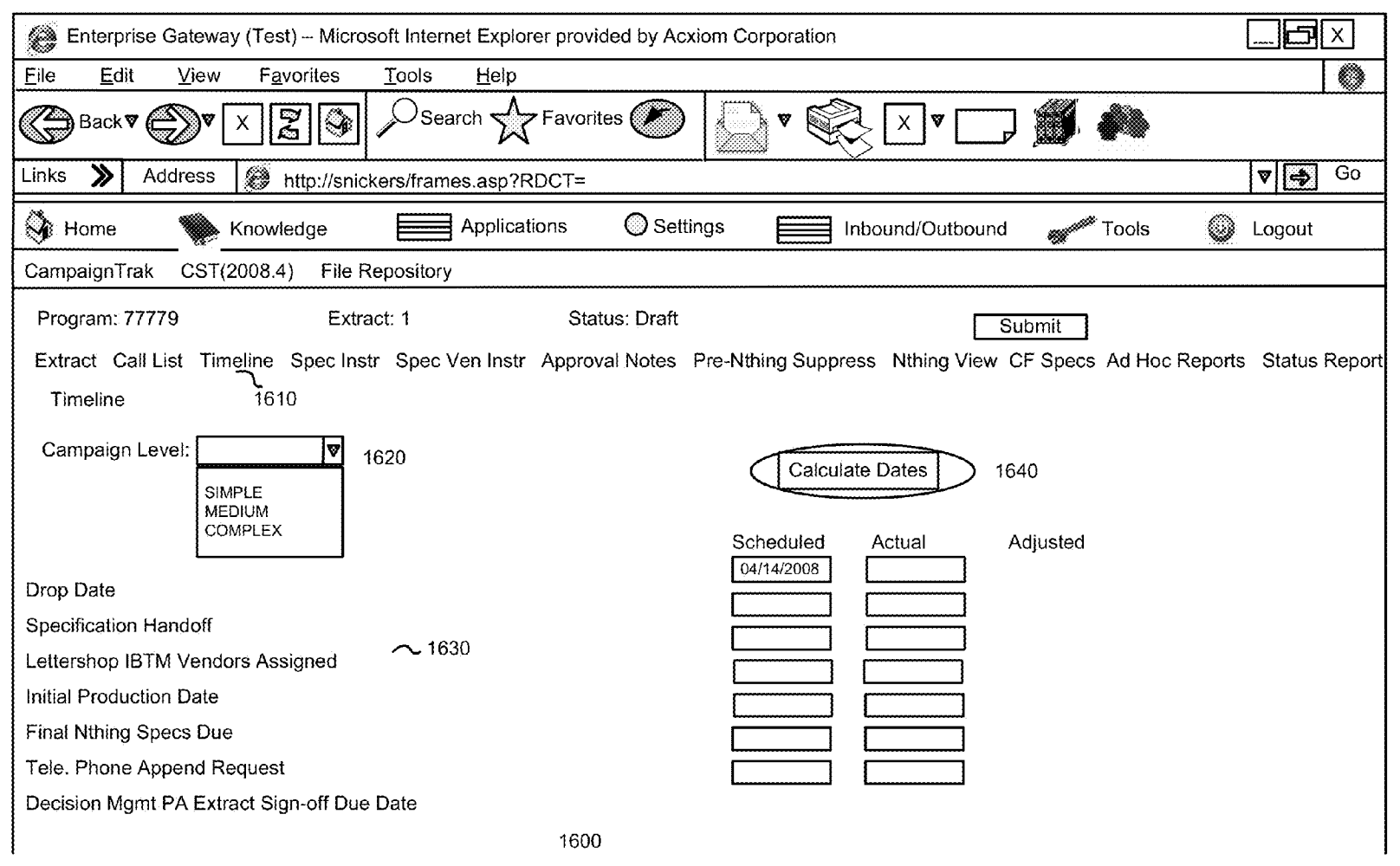

If no changes or updates are needed within the cell detail pages, a user may continue to timeline user interface 1600. FIG. 16 illustrates timeline user interface 1600 that may be accessed by selection of a timeline tab 1610. The timeline user interface 1600 may further include a selectable option campaign level 1620, and selectable dates for a drop date 1622. Based on the drop date 1622 selected by the user and the selected campaign level, the system may calculate dates for specification handoff, vendors, and other displayed events. More specifically, components of the system may calculate all of the due dates for campaign specific steps (Extract due, Lettershop due, ACAPS Due, etc.) using the uploaded drop date 1622 and the appropriate date formula based on the campaign complexity level 1620. To populate the campaign dates, the user selects the campaign level drop-down box 1620 and campaign complexity level (Simple, Medium, Complex) 1622 and subsequently selects a calculate dates button 1640. Entry blanks (not shown) may also be provided for free form text entry.

FIG. 17 illustrates a populated timeline user interface 1700 in accordance with an embodiment of the invention. Once the user verifies that all of the dates are populated correctly, the user may select the update button (not shown in FIG. 17). The timeline user interface 1700 may display campaign level 1710, and dates for multiple events 1720. The timeline user interface 1700 may further display scheduled, actual, and adjusted dates 1750. The adjusted date captures the date that changes are made to a scheduled or actual date. A calculate dates button 1740 may be provided to activate the system to calculate the dates. Furthermore, the system may restrict entry of dates so that specific users or types of users are authorized to set specific dates and other users are restricted.

Figure 18:
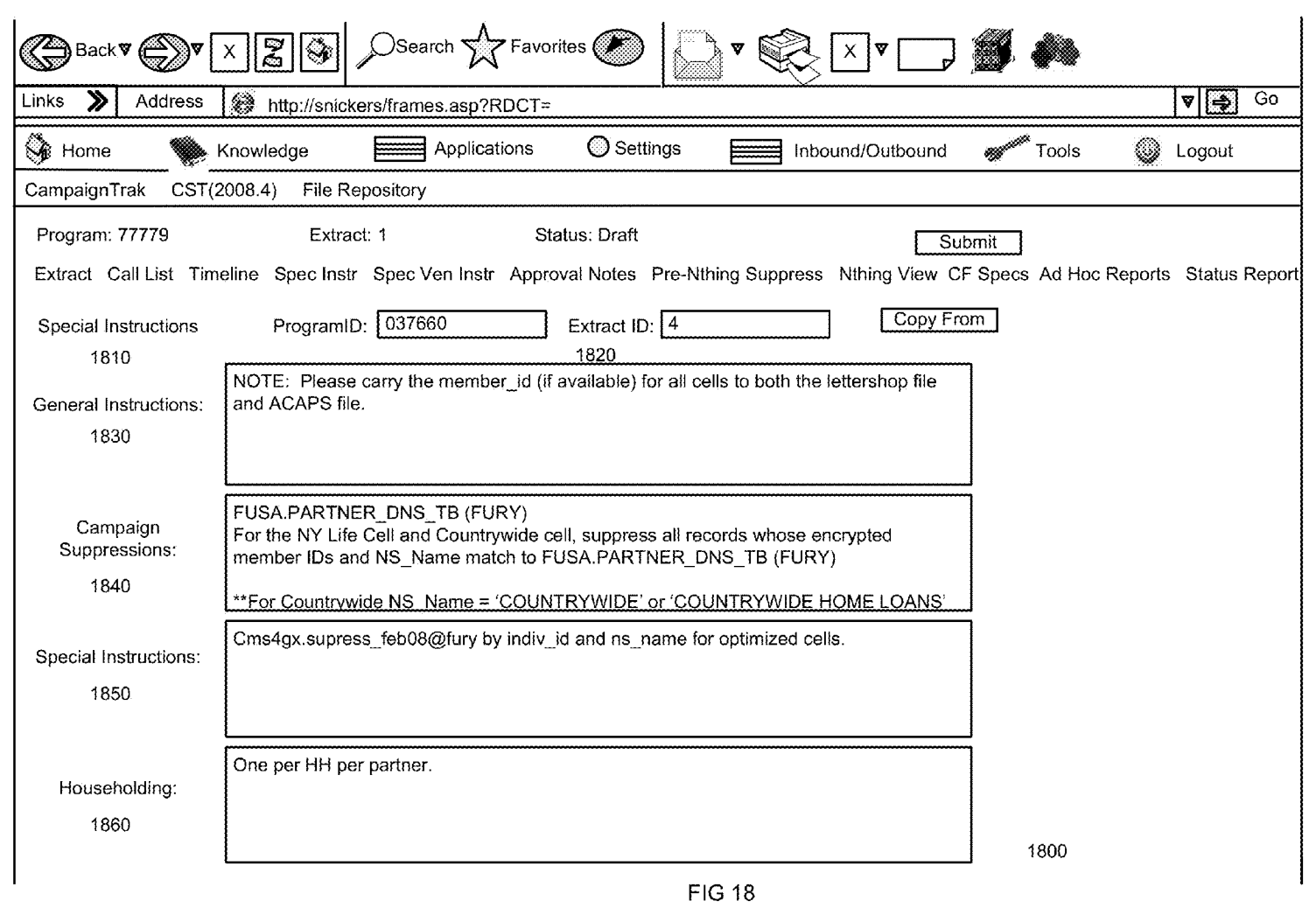

FIG. 18 illustrates a special instructions user interface 1800 in accordance with an embodiment of the invention. The special instructions user interface 1800 may be activated by selecting a special instructions tab 1802 and may include identifying data such as program ID and extract number 1820. The user interface 1800 may include special instructions 1810 encompassing general instructions 1830, campaign suppressions 1840, special suppressions 1850, and house-holding 1860. The special instructions tab allows any free form/adhoc instructions to be listed that cannot be built into one of the various drop-down, table join, or suppression sections. In preferred embodiments, any instructions on the special instructions tab are used for manual campaign processing only. Special instructions can be copied from an existing campaign by using a copy from button 1826 in conjunction with entering the program ID and extract number in the boxes 1820 at the top of the page.

A special vendor instructions user interface (not shown) may be displayed upon selection of a tab 1804 on the special instructions user interface 1800. The special vendor instructions tab houses special instructions that affect how an extract output file gets to a vendor, how an extract file needs to be created, or contains extract-specific information to be communicated to the vendor.

Selection of an approval notes tab 1806 on the list on the top of the user interface 1800 causes an approval notes page to be displayed. The approval notes page displays all stored campaign approvals and/or exception notes, when required, and where the exception submission signoff occurs. If during a campaign something occurs which requires the campaign managers to provide sign off, other users, such as CE or CF may include a notation on this page in the appropriate section. If a note is entered into the notes section, the extract approved should be checked before the campaign can be submitted.

Figure 19:
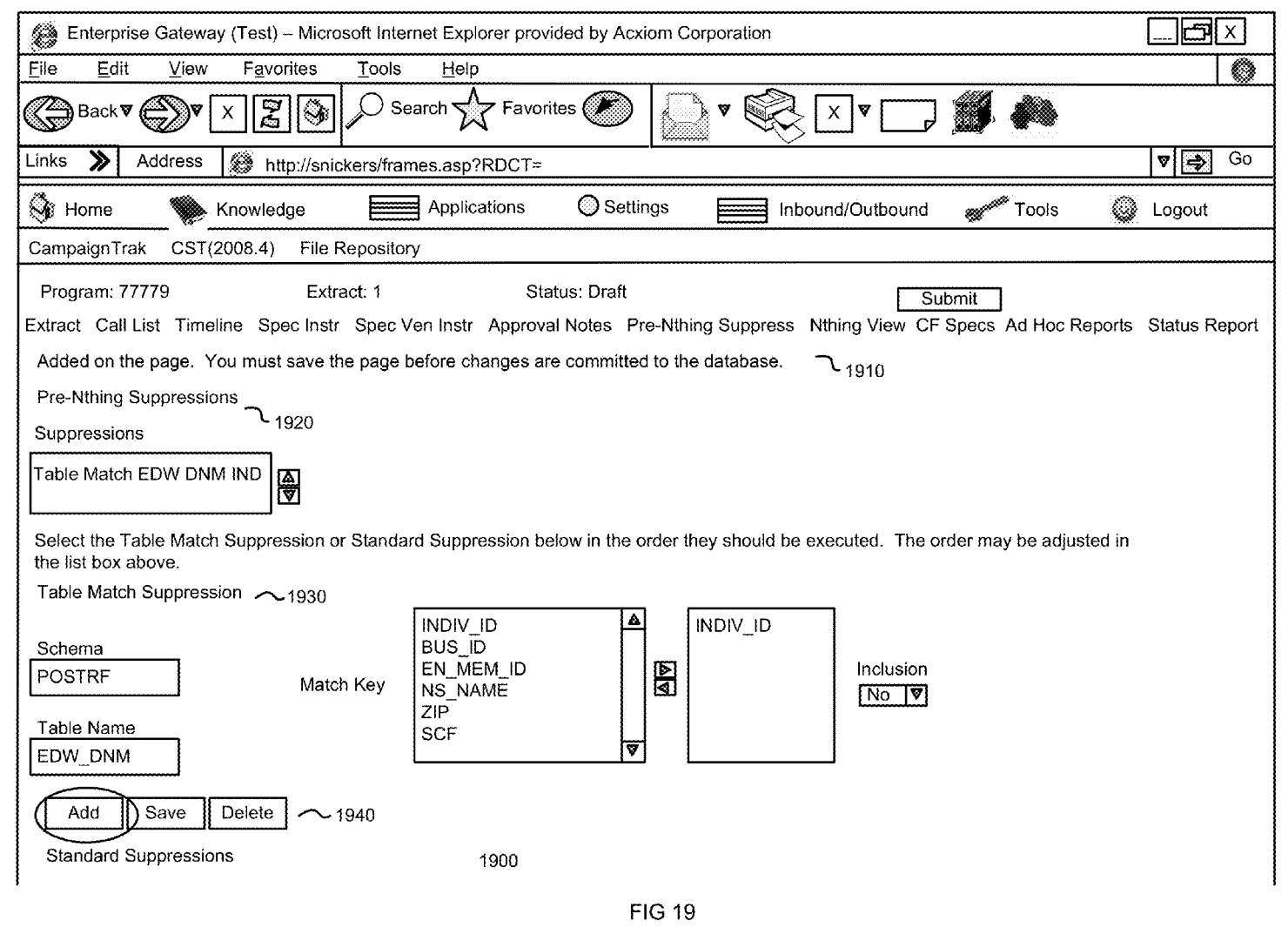

FIG. 19 illustrates a preliminary suppressions user interface 1900 that may be accessed by selection of suppressions tab 1808 in FIG. 18. The preliminary suppressions user interface 1900 contains suppression instructions and values uploaded from the saved suppressions tile. As previously described, preliminary suppressions may be applied to either the entire campaign population or to large partner sections of the campaign population. The preliminary suppressions user interface 1900 allows preliminary suppressions to be altered, updated, re-ordered, or added.

The preliminary suppressions user interface 1900 may include tab menu 1910, a suppressions drop-down menu 1920, table match suppressions 1930, and function buttons 1940. To use the table match suppressions 1930, a user enters a schema name 1932. The user may further join fields by selecting one or more match keys 1934. To do this, the user may select each field from drop down menu 1936 individually. In embodiments of the invention, the user clicks the right arrow key to move the selected field into a keep box 1938. To remove fields from the keep box 1938, the user may click on the field to remove and click the left arrow.

An inclusion field 1942 may be set to either "Yes" or "No". When the field is set to "Yes" (join), matching records are kept. When the field is set to "No" (anti-join), matching records are dropped.

After entering and verifying all of the information for this table match, the user can select add button 1950 to complete the table match suppression to the suppressions list at the top of the page.

Figure 20:
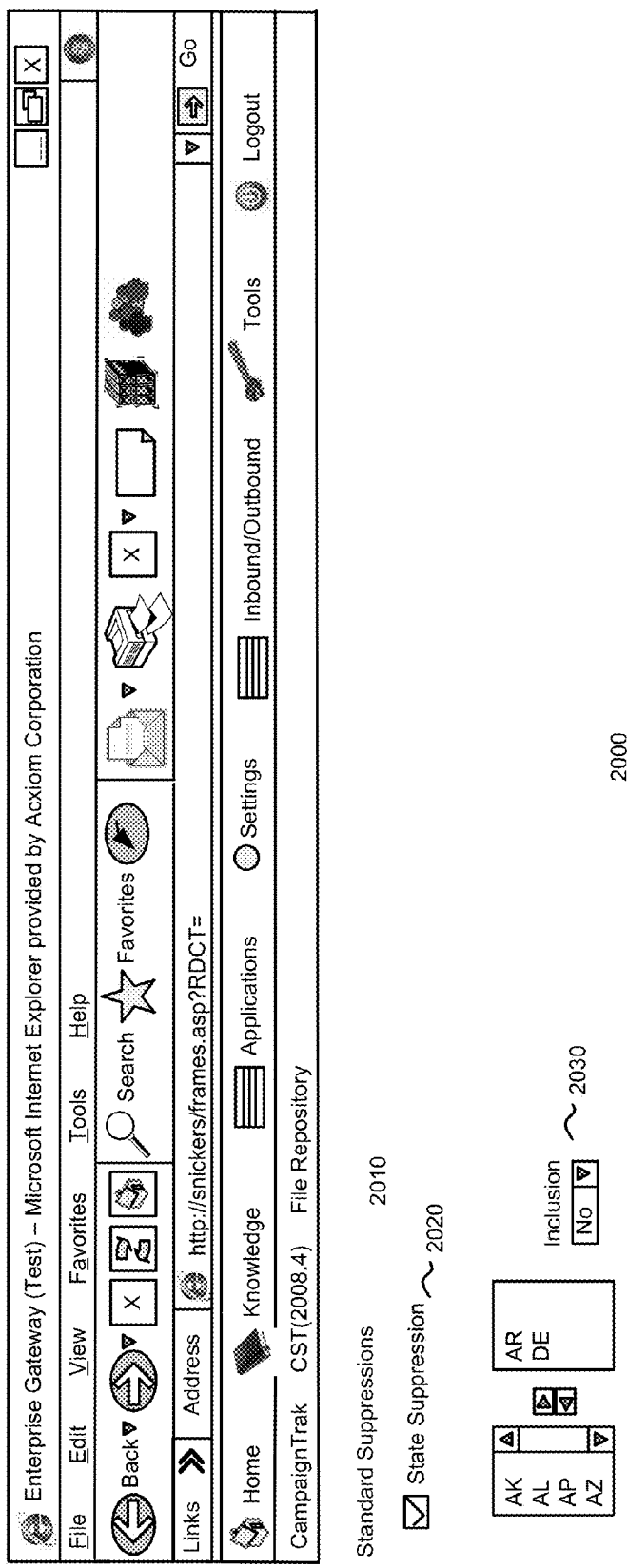
FIG. 20 illustrates a standards suppressions user interface in accordance with an embodiment of the invention.

FIG. 20 illustrates a standards suppressions user interface 2000 in accordance with an embodiment of the invention. Standard suppressions 2010 may include a checkbox 2012, state suppressions 2020 along with drop down menus for states 2022 and choice of inclusion 2030, a keep box 2026, and navigation arrows 2024. States may be removed from the keep box by highlighting them within the keep box and clicking the left arrow. The state suppression section 2020 allows any state or combination of states to be used as a limitation to or as a suppression against the entire campaign population. To apply the state suppression, the user activates the check box 2012 and select one or more states to use in the suppression/limitation. After all of the needed states are highlighted, selection of the right navigation arrow moves the states into the keep box 2026. Inclusion fields 2030 work similarly to those described above with respect to FIG. 19.

Thus, the system and method perform several functions including (1) standardizing requirements; (2) generating code to select records from a database; and (3) automatically generating output tiles in proper format or completing fulfillment. The user friendly user interlaces are provided that allow entry of requirements into a marketing matrix and guides a user through the process of campaign execution and campaign fulfillment. The disclosed system standardizes requirements and automatically generates a campaign list, while allowing for manual intervention through the use of special instructions.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A computer-implemented system for automatic management of targeted marketing campaigns, the system comprising:
   a computer memory for storing at least marketing matrix data and suppression information;
   an electronic display enabling operation of user interface presentation components for presenting information including the marketing matrix data and the suppression information to the user;
   user input components for allowing selection of desired marketing matrix data defining a target population and selection of suppressions for limiting the target population by eliminating specified targets; and
   computer processing components programmed to perform operations including,
   integrating the selected marketing matrix with the selected suppressions and automatically generating record selection codes, the record selection codes processed by the computer processing components to automatically select records from a database based on the marketing matrix data and suppressions, through at least comparing the record selection codes with recipient entries in the database, the record selection codes identifying recipients using recipient identifiers;

automatically creating a selection table including the selected records by matching the recipient identifiers for the recipients;

generating a campaign list based on the created selection table; and transmitting the generated campaign list to at least one list recipient.

2. The system of claim 1, further comprising marketing matrix components for storing selectable marketing matrix data and allowing manual entry of marketing matrix data.

3. The system of claim 1, wherein the selected suppressions include one of selectable suppressions selected by the user from stored options, mandatory suppressions mandated by existing regulations, and manually entered suppressions.

4. The system of claim 1, wherein the integration is activated by combining a created marketing matrix file with a created suppression file.

5. The system of claim 1, wherein the marketing matrix data includes at least a campaign date and a campaign type.

6. The system of claim 1, wherein the user interface presentation components comprise a timeline interface for providing a campaign timeline based on a selectable campaign level.

7. The system of claim 1, wherein the user interface presentation components comprise a special instructions user interface allowing manual entry of the suppressions.

8. The system of claim 1, further comprising tracking components implementing a stored contact history table to track recipients and responses.

9. The system of claim 1, further comprising verification components for running reports validating the selection process.

10. The system of claim 1, wherein the user interface presentation components comprise an extract list tab for displaying a list of selectable extracts.

11. The system of claim 10, wherein the user interface presentation components comprise an extract detail page for displaying details of a selected extract.

12. The system of claim 11, wherein the extract detail page comprises at least one selectable reports tab, a selectable cell list tab, a selectable suppressions tab, and a selectable special instructions tab.

13. The system of claim 12, further including a cell detail page activated through selection of cell on the cell list page.

14. The system of claim 11, wherein the special instructions tab enables viewing and editing of special instructions for the selected extract.

15. A computer-implemented method for management of targeted marketing campaigns, the method implementing a computing system including user input components, a processor, and a database, the method comprising:

providing user interface presentation components for allowing selection of marketing matrix data defining a target population and selection of suppressions for limiting the target population by eliminating specified targets, the selection accomplished through the user input components;

receiving entered marketing matrix and suppression data entered through the user input components;

integrating, using the processor, the selected marketing matrix with the selected suppressions and automatically generating record selection codes for the marketing matrix data and suppressions;

selecting records from the database by processing, using the processor, the automatically generated record selection codes through at least comparing the record selection codes with recipient entries in the database, the record selection codes identifying recipients using recipient identifiers;

creating a selection table including the selected records, using the processor, by matching the recipient identifiers for the recipients; and generating a campaign list based on the created selection table.

16. The method of claim 15, further comprising providing marketing matrix components for storing selectable marketing matrix data and allowing manual entry of marketing matrix data.

17. The method of claim 15, further comprising providing suppressions components for storing selectable suppressions selectable by the user from stored options, mandatory suppressions mandated by existing regulations, and for allowing manual entry of suppressions.

18. The method of claim 15, further comprising activating the integration by combining a created marketing matrix file with a created suppression file.

19. The method of claim 15, wherein the marketing matrix data includes at least a campaign date and a campaign type.

20. The method of claim 15, further comprising providing user interface presentation components including a timeline interface for providing a campaign timeline based on a selectable campaign level.

21. The method of claim 15, wherein the user interface presentation components comprise a special instructions user interface allowing manual entry of the suppressions.

22. The method of claim 15, further comprising providing tracking components implementing a stored contact history table to track recipients and responses.

23. The method of claim 15, further comprising validating the selection process with verification components for running reports.

24. The method of claim 15, further comprising providing an extract list tab for displaying a list of selectable extracts.

25. The method of claim 24, further comprising providing an extract detail page for displaying details of a selected extract.

26. The method of claim 25, wherein the extract detail page comprises at least one selectable reports tab, a selectable cell list tab, a selectable suppressions tab, and a selectable special instructions tab.

27. The method of claim 26, further comprising providing a cell detail page activated through selection of cell on the cell list tab.

28. The method of claim 25, wherein the special instructions tab enables viewing and editing of special instructions for the selected extract.

29. The method of claim 15, further comprising transmitting the campaign list to at least one list recipient.

30. A computer-implemented system for automatic management of targeted marketing campaigns, the system comprising:

a computer memory for storing at least marketing matrix data and suppression information;

an electronic display enabling operation of user interface presentation components for presenting information including the marketing matrix data and the suppression information to the user;

user input components for allowing selection of desired marketing matrix data defining a target population and selection of suppressions for limiting the target population by eliminating specified targets; and computer processing components programmed to perform operations including, standardizing requirements for a marketing campaign, the standardizing including storing selectable marketing matrix data and allowing entry of additional marketing matrix data;

storing suppressions, the stored suppressions including selectable suppressions and mandatory suppressions, and for allowing entry of additional suppressions, and;

integrating the marketing matrix with the suppressions and automatically generating record selection codes, the record selection codes processed by the computer processing components to automatically select records from a database based on the marketing matrix data and suppression components, through at least comparing the record selection codes with recipient entries in the database, the record selection codes identifying recipients using recipient identifiers;

automatically creating a selection table including the selected records, by matching the recipient identifiers for the recipients;

processing records stored in the database to provide a campaign list, the processing comprising, automatically selecting records from the database based on the marketing matrix data, suppression components and created selection table including the selected records, validating the selection process, and generating the campaign list based on the created selection table; and facilitating fulfillment of the marketing campaign, the fulfillment comprising, transmitting the generated campaign list to at least one list recipient, and implementing a stored contact history table to track recipients and responses.

* * * * *